(12) United States Patent
Takeuchi et al.

(10) Patent No.: US 7,673,112 B2
(45) Date of Patent: Mar. 2, 2010

(54) VOLUME MANAGEMENT SYSTEM AND METHOD

(75) Inventors: Shinya Takeuchi, Yokohama (JP);
Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 479 days.

(21) Appl. No.: 10/954,287

(22) Filed: Oct. 1, 2004

(65) Prior Publication Data
US 2006/0010289 A1    Jan. 12, 2006

(30) Foreign Application Priority Data
Jul. 6, 2004    (JP)    ............................. 2004-198865

(51) Int. Cl.
  *G06F 3/01* (2006.01)
  *G06F 3/048* (2006.01)
  *G06F 12/02* (2006.01)
  *G06F 12/08* (2006.01)
(52) U.S. Cl. ................. 711/170; 711/112; 711/114; 711/156; 715/744; 715/745; 715/747
(58) Field of Classification Search ............... 711/112, 711/114, 156, 170; 715/744, 745, 747
See application file for complete search history.

(56) References Cited

U.S. PATENT DOCUMENTS

| 4,310,883 | A | * | 1/1982 | Clifton et al. | ............... | 707/205 |
| 4,607,346 | A | * | 8/1986 | Hill | ............... | 711/170 |
| 5,115,501 | A | * | 5/1992 | Kerr | ............... | 707/9 |
| 5,287,500 | A | * | 2/1994 | Stoppani, Jr. | ............... | 711/211 |
| 5,640,595 | A | * | 6/1997 | Baugher et al. | ............... | 710/10 |
| 5,666,502 | A | * | 9/1997 | Capps | ............... | 715/811 |
| 6,189,018 | B1 | * | 2/2001 | Newman et al. | ............... | 715/501.1 |

(Continued)

FOREIGN PATENT DOCUMENTS

JP    05-108425    4/1993

(Continued)

OTHER PUBLICATIONS

Wikipedia. Computer. Wikimedia Foundation, Inc. Revision as of Jun. 23, 2003. http://en.wikipedia.org/wiki/Computer.*

(Continued)

*Primary Examiner*—Sanjiv Shah
*Assistant Examiner*—Samuel Dillon
(74) *Attorney, Agent, or Firm*—Antonelli, Terry, Stout & Kraus, LLP.

(57) ABSTRACT

The system according to the present invention comprises a first storage area for storing a plurality of logical volume data where the attributes on a plurality of logical volumes are recorded respectively, a second storage area for storing allocation destination candidate data where the attributes on an allocation destination candidate selected from one or more allocation destination candidates are recorded, a third storage area for storing one or more history data to indicate a relationship of a logical volume having a certain attribute among the plurality of logical volumes to an allocation destination candidate having a certain attribute among one or more allocation destination candidates, a device refining unit for refining the plurality of logical volume data to one or more logical volume data based on the plurality of logical volume data, allocation destination candidate data, and one or more history data, and a refined result output section for outputting the content of the refined one or more logical volume data.

10 Claims, 19 Drawing Sheets

U.S. PATENT DOCUMENTS

| | | | |
|---|---|---|---|
| 6,341,317 B1* | 1/2002 | D'Errico et al. | 710/15 |
| 2004/0199639 A1* | 10/2004 | Harris | 709/227 |
| 2005/0114593 A1* | 5/2005 | Cassell et al. | 711/114 |

OTHER PUBLICATIONS

Dunn, Michael. Most Recently Used List in a Combobox. CodeProject. Archive.org date of Jan. 10, 2001. http://www.codeproject.com/combobox/mrucombo.asp.*

Buck, A.L.; Coyne, R.A. The storage server as virtual volume manager. Mass Storage Systems, 1993. 'Putting all that Data to Work'. Proceedings., Twelfth IEEE Symposium on, vol., Iss., Apr. 26-29, 1993. pp. 79-86.*

E. Adar and D. Karger. Haystack: Per-user information environments. In Proceedings of CIKM 1999.*

Tanenbaum, A.S. Structured Computer Organization. Prentice-Hall, Inc. 1984. pp. 10-12.*

* cited by examiner

FIG. 2

| # | HOST NAME | APPLICATION NAME/USER NAME | FLAG |
|---|---|---|---|
| 1 | host1 | user1 | USER |
| 2 | host1 | app1 | APPLICATION |
| 3 | host1 | app2 | APPLICATION |

| # | DATA ELEMENT |
|---|---|
| 1 | PORT INFORMATION |
| 2 | LOGICAL VOLUME INFORMATION |
| 3 | PATH INFORMATION |

| # | PORT INFORMATION ELEMENT |
|---|---|
| 1 | PORT IDENTIFIER |
| 2 | TOPOLOGY |
| 3 | PORT WWN |

| # | LOGICAL VOLUME INFORMATION ELEMENT |
|---|---|
| 1 | LOGICAL VOLUME IDENTIFIER |
| 2 | LOGICAL VOLUME CAPACITY |
| 3 | RAID TYPE |
| 4 | REDUNDANCY FLAG |

| # | PATH INFORMATION ELEMENT |
|---|---|
| 1 | PATH IDENTIFIER |
| 2 | PORT IDENTIFIER |
| 3 | LOGICAL VOLUME IDENTIFIER |
| 4 | ALLOCATION DESTINATION DATA |

| # | PARAMETER LIST DATA ELEMENT |
|---|---|
| 1 | HOST NAME |
| 2 | APPLICATION NAME/USER NAME |
| 3 | FLAG (FLAG FOR IDENTIFYING WHETHER #2 IS INFORMATION TO INDICATE APPLICATION NAME OR INFORMATION TO INDICATE USER NAME) |

| # | LOGICAL VOLUME LIST DATA ELEMENT |
|---|---|
| 1 | LOGICAL VOLUME IDENTIFIER |
| 2 | LOGICAL VOLUME CAPACITY |
| 3 | RAID TYPE |
| 4 | REDUNDANCY FLAG |

| # | HISTORY DATA ELEMENT |
|---|---|
| 1 | DATE AND TIME |
| 2 | HOST NAME |
| 3 | USER NAME |
| 4 | APPLICATION NAME |
| 5 | LOGICAL VOLUME CAPACITY |
| 6 | RAID TYPE |
| 7 | REDUNDANCY FLAG |

| # | HOST NAME | APPLICATION/USER NAME | FLAG |
|---|---|---|---|
| 1 | host1 | user1 | USER |
| 2 | host1 | app1 | APPLICATION |
| 3 | host1 | app2 | APPLICATION |
| 4 | host2 | user2 | USER |
| 5 | host2 | app1 | APPLICATION |
| 6 | host2 | app2 | APPLICATION |
| 7 | host2 | app3 | APPLICATION |
| 8 | host3 | app3 | USER |
| 9 | host3 | user3 | APPLICATION |

| # | VOLUME IDENTIFIER | LOGICAL VOLUME CAPACITY | RAID TYPE | REDUNDANCY FLAG |
|---|---|---|---|---|
| 1 | Volume.001 | 10M Bytes | RAID0 | true |
| 2 | Volume.002 | 15M Bytes | RAID0 | true |
| 3 | Volume.003 | 10M Bytes | RAID5 | false |
| 4 | Volume.004 | 30M Bytes | RAID1 | true |
| 5 | Volume.005 | 20M Bytes | RAID1 | true |
| 6 | Volume.006 | 10M Bytes | RAID0 | true |
| 7 | Volume.007 | 15M Bytes | RAID0 | true |

FIG. 14A

| # | DATE AND TIME | HOST NAME | USER NAME | APPLICATION NAME | VOLUME CAPACITY | RAID TYPE | REDUNDANCY FLAG |
|---|---|---|---|---|---|---|---|
|   |   |   |   |   |   |   |   |

FIG. 14B

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-14:00 | host1 | user1 | app1 | 10M Bytes | RAID0 | true |

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-14:00 | host1 | user1 | app1 | 10M Bytes | RAID0 | true |
| 2 | 4/1-15:00 | host1 | user1 | app2 | 15M Bytes | RAID0 | true |

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-14:00 | host1 | user1 | app1 | 10M Bytes | RAID0 | true |
| 2 | 4/1-15:00 | host1 | user1 | app2 | 15M Bytes | RAID0 | true |
| 3 | 4/2-11:00 | host2 | user2 | app2 | 10M Bytes | RAID5 | false |

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-14:00 | host1 | user1 | app1 | 10M Bytes | RAID0 | true |
| 2 | 4/1-15:00 | host1 | user1 | app2 | 15M Bytes | RAID0 | true |
| 3 | 4/2-11:00 | host2 | user2 | app2 | 10M Bytes | RAID5 | false |
| 4 | 4/2-12:30 | host2 | user2 | app1 | 30M Bytes | RAID1 | true |

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-14:00 | host1 | user1 | app1 | 10M Bytes | RAID0 | true |
| 2 | 4/1-15:00 | host1 | user1 | app2 | 15M Bytes | RAID0 | true |
| 3 | 4/2-11:00 | host2 | user2 | app2 | 10M Bytes | RAID5 | false |
| 4 | 4/2-12:30 | host2 | user2 | app1 | 30M Bytes | RAID1 | true |
| 5 | 4/3-15:00 | host2 | user2 | app3 | 20M Bytes | RAID0 | true |

| # | ITEM | |
|---|------|---|
| 1 | DATE AND TIME | ~117 |
| 2 | USER NAME | |
| 3 | APPLICATION NAME | |
| 4 | DATA CONTENT | |

FIG. 16B

| # | ITEM | |
|---|------|---|
| 1 | DATE AND TIME | ~119 |
| 2 | LOGICAL VOLUME IDENTIFIER (NUMBER) | |
| 3 | DATA CONTENT | |

FIG. 16C

| # | ITEM | |
|---|------|---|
| 1 | DATE AND TIME | ~121 |
| 2 | USER NAME | |
| 3 | APPLICATION NAME | |
| 4 | LOGICAL VOLUME IDENTIFIER (NUMBER) | |

| # | DATE AND TIME | USER NAME | APPLICATION NAME | DATA CONTENT |
|---|---|---|---|---|
| 1 | 4/1-14:00 | user1 | app1 | aaabbbccc |
| 2 | 4/1-15:00 | user1 | app2 | xxxyyyzzz |
| 3 | 4/2-11:00 | user2 | app2 | oooppppqqq |

119

| # | DATE AND TIME | LOGICAL VOLUME IDENTIFIER | DATA CONTENT |
|---|---|---|---|
| 1 | 4/1-14:00 | Volume.001 | kkkuuuhhh |
| 2 | 4/1-15:00 | Volume.002 | xxxyyyzzz |
| 3 | 4/2-11:00 | Volume.003 | dddeeefffff |

121

| # | DATE AND TIME | USER NAME | APPLICATION NAME | LOGICAL VOLUME IDENTIFIER |
|---|---|---|---|---|
| 1 | 4/1-15:00 | user1 | app2 | Volume.002 |

FIG. 18B

| # | DATE AND TIME | HOST NAME | USER NAME | APPLICATION NAME | VOLUME CAPACITY | RAID TYPE | REDUNDANCY FLAG |
|---|---|---|---|---|---|---|---|
| 1 | 4/1-15:00 | host1 | user1 | app2 | 15M Bytes | RAID0 | true |

65

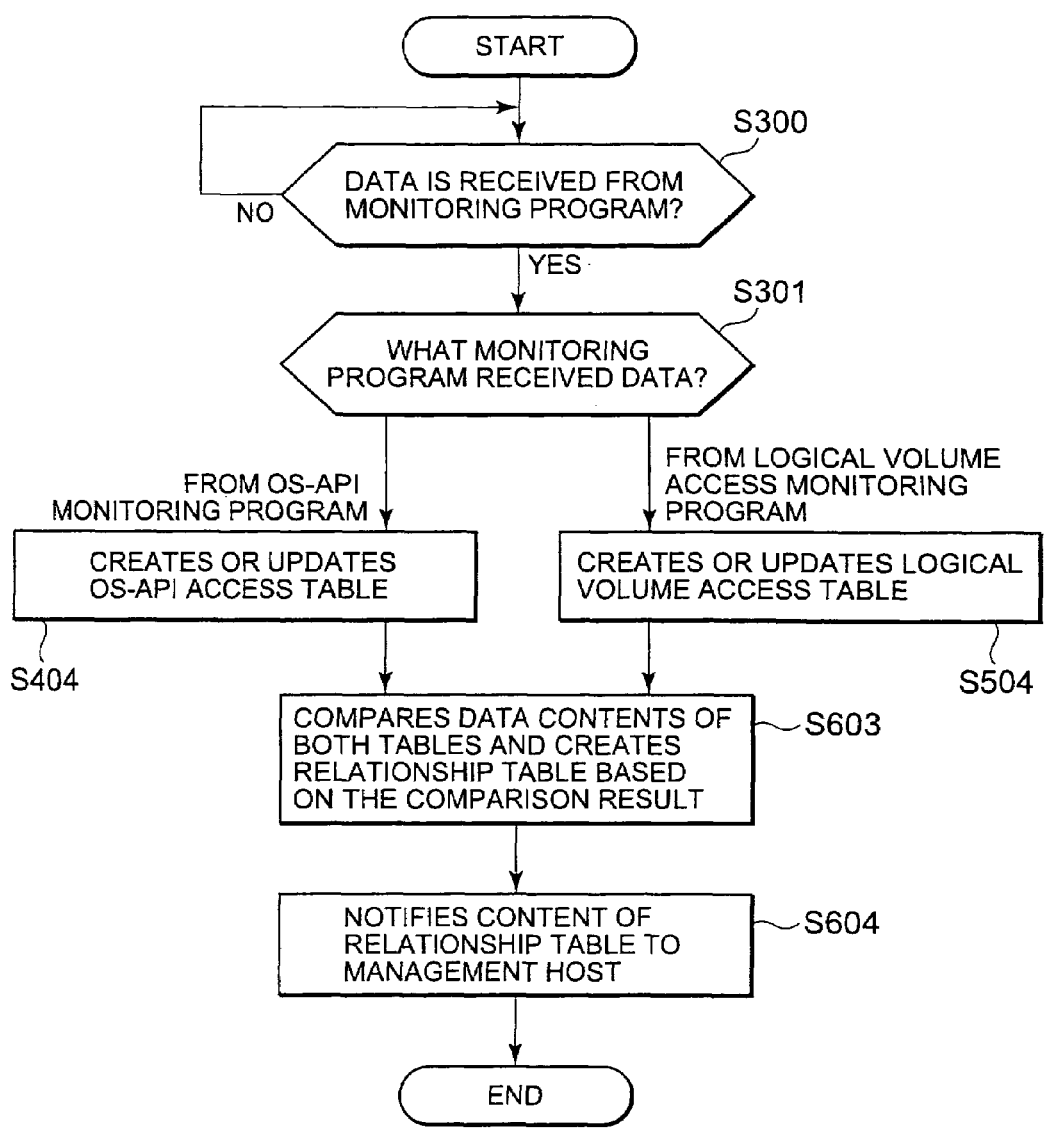

VOLUME MANAGEMENT SYSTEM AND METHOD

CROSS-REFERENCE TO RELATED APPLICATIONS

This application relates to and claims priority from Japanese Patent Application No. 2004-198865 filed on Jul. 6, 2004, the entire disclosure of which is incorporated herein by reference.

BACKGROUND OF THE INVENTION

1. Field of the Invention

The present invention relates to a computer technology for refining a plurality of logical volumes to a smaller number of logical volumes.

2. Description of the Related Art

Technology for providing a plurality of logical storage devices (logical volumes) on one or more physical storage devices (e.g. hard disks) has already been known. From such a plurality of logical volumes, one or more logical volumes can be selected. This may be performed, for example, in a computer system where a plurality of operational host computers (hereafter called "operational host (s)"), one or more management host computers (hereafter called "management host (s)"), and one or more storage sub-systems further comprising a plurality of logical volumes (e.g. RAID system) are connected to such a communication network as a SAN (Storage Area Network). Specifically, for example, an administrator selects one or more logical volumes from a plurality of logical volumes for each operational host using the management host, and allocates the selected logical volumes to the operational host. In this case, the administrator selects seemingly appropriate logical volumes based on experiment, considering the purpose of the operational host and the attributes on the logical volume (e.g. storage capacity and RAID type).

However, for a human to select from a plurality of logical volumes based on their judgment is a burden, and increases operation cost. Because the number of logical volumes to be provided as choices is in some cases enormous, a logical volume allocation operation for each operational host may be required to be performed frequently.

As a technology to solve such problems, a technology disclosed in Japanese Patent Application Laid-Open No. H5-108425 is available, that is, a computer retrieves logical volumes having predetermined logical volume attributes, such as open storage capacity and input/output load, from the plurality of logical volumes, and presents the retrieved logical volumes to the administrator as volume candidates.

SUMMARY OF THE INVENTION

However, merely executing processing to retrieve one or more logical volumes from a plurality of logical volumes based on logical volume attributes does little to decrease the burden on an individual who selects the logical volumes. Because it depends on the purpose of the operational host what attributes are appropriate for the logical volume to be allocated, so the retrieval conditions (e.g. logical volume attributes) must be changed according to purpose, which is a burden for the administrator.

With the foregoing in view, it is an object of the present invention to decrease the burden on the individual who selects at least one logical volume from a plurality of logical volumes. Specifically, it is an object of the present invention to make it unnecessary to change the conditions to retrieve at least one logical volume from the plurality of logical volumes depending on the purpose of the computer to which the logical volume is allocated.

Other objects of the present invention will be clarifies in the description herein below.

A volume refining system according to the first aspect of the present invention (hereafter called first volume refining system) comprises: a first storage area for storing a plurality of logical volume data where attributes on a plurality of logical volumes are recorded respectively; a second storage area for storing allocation destination candidate data where attributes on an allocation destination candidate selected from one or more allocation destination candidates are recorded; a third storage area for storing one or more history data to indicate a relationship of a logical volume having a certain attributes among the plurality of logical volumes to an allocation destination candidate having a certain attribute among the one or more allocation destination candidates; and a volume refining unit for refining the plurality of logical volume data into one or more logical volume data based on the plurality of logical volume data, the allocation destination candidate data, and the one or more history data, and outputting the content of the refined one or more logical volume data.

The plurality of logical volume data may be received from an external computer via a communication network, for example.

In the first embodiment of the first volume refining system, the volume refining unit may provide a GUI which accepts the selection of a desired logical volume data from the plurality of logical volume data or the refined one or more logical volume data, (e.g. [this GUI] may be provided to a remote terminal via a communication network). Also in this first embodiment, the first volume refining system further comprises a history update unit. The history update unit generates history data where at least one attribute element among the attributes included in the selected logical volume data, and at least one attribute element among the attributes included in the allocation destination candidate data, are associated based on the logical volume data selected using the GUI and the allocation destination candidate data, and stores the generated history data in the third storage area.

In the second embodiment of the first volume refining system, the attributes included in the allocation destination candidate data may have a plurality of allocation destination candidate attribute elements. And each of the plurality of history data includes the plurality of allocation destination candidate attribute elements. The volume refining unit may select the history data to be used for processing for refining the logical volume data based on the judgment whether an allocation destination candidate attribute element matching with at least one of the plurality of allocation destination candidate attribute elements included in the allocation destination candidate data exists in each of a plurality of history data.

In the third embodiment of the first volume refining system, the first volume refining system according to the second embodiment may further comprise a fourth storage area for storing a weight value to indicate a weight for each of the plurality of allocation destination candidate attribute elements. The volume refining unit may determine an evaluation value for each of the plurality of history data, based on the information on whether an allocation destination candidate attribute element matching with at least one of the plurality of allocation destination candidate attribute elements included in the allocation destination candidate data exists in each of the plurality of history data and each weight value of the plurality of allocation destination candidate attribute elements, and determine the history data which has the evaluation value matching a predetermined condition among the plurality of determined evaluation values as the history data to be used for the processing for refining the logical volume data.

In the fourth embodiment of the first volume refining system, the allocation destination candidate in the third embodiment may be an information processing terminal for writing data to the logical volume or reading data from the logical volume. The information processing terminal have one or more application programs, and/or one or more pieces of user identification information corresponding to one or more users respectively is registered. The plurality of allocation destination candidate attribute elements may include the (1) and (2) and/or (3) among the following (1) to (3), that is, (1) terminal identification information of the information processing terminal, (2) application identification information of one application program among the one or more application programs, and (3) one piece of user identification information among the one or more pieces of user identification information. The weight value may become higher in the order of the weight value of the user identification information, the weight value of the application identification information, and the weight value of the terminal identification information.

In the fifth embodiment of the first volume refining system, the first volume refining system may further comprise a history update unit. The history update unit may acquire access relationship data where information indicating which allocation destination candidate, among the one or more allocation destination candidates accessed which logical volume, among the one or more logical volumes is described, generate history data based on the acquired access relationship data, and register the generated history data in the third storage area.

In the sixth embodiment of the first volume refining system, the allocation destination candidate in the fifth embodiment may be an information processing terminal for writing data to the logical volume or reading data from its logical volume. The information processing terminal may have one or more application programs. The information processing terminal may further comprise: an application interface unit to be an interface for the application program; a command issuing unit for issuing a command to the logical volume; a monitoring unit for monitoring the application interface unit and the command issuing unit; an application access storage area for storing information on the access of the application interface unit; and a command access storage area for storing information on the access of the command issuing unit. The application interface unit may receive a write request or read request of data from one or the one or more application programs, output the received write request or read request, and receive write data, which is a write target, from the application program which is the write request issuing source, and output the write data to the command issuing unit, or receive read data, which is a read target and was output from the command issuing unit, and output the read data to the application program which is the read request issuing source. The command issuing unit may receive the write request or read request which was output, select the logical volume to be a destination from the plurality of logical volumes according to the write request or read request, generate and output a write command or read command for the selected logical volume, and output the write data to the logical volume, or receive the read data from the logical volume responding to the read command, and output the read data to the application interface unit. The monitoring unit may perform the following (A)-(D) processing, that is, (A) acquiring the application identification information of the application program which issued a write request or read request to the application interface unit, acquiring a first data content, which is a content of the write data or the read data received by the application interface unit, and writing the application identification information and the first data content to the application access storage area, (B) acquiring the logical volume identification information of a logical volume to be a destination from a write command or read command which was output by the command issuing unit from the write command or read command, acquiring a second data content, which is a content of the write data or read data received by the command issuing unit, and writing the logical volume identification information and the second data content to the command access storage area, (C) detecting that the written first data content and second data content match, acquiring the application identification information corresponding to the matched first data content from the application access storage area, and acquiring the logical volume identification information corresponding to the matched second data content from the command access storage area, and (D) generating and outputting the access relationship data including the acquired application identification information and logical volume identification information (e.g. outputting it to a predetermined external information processing terminal). The history update unit may acquire the access relationship data which was output.

Each composing element of the above mentioned volume refining system can be constructed by hardware, computer programs or a combination thereof.

A volume refining method according to the second aspect of the present invention comprises steps of: storing a plurality of logical volume data, where the attributes on a plurality of logical volumes are recorded respectively, to a first storage area; storing allocation destination candidate data, where the attributes on an allocation destination candidate selected from one or more allocation destination candidates, to a second storage area; storing one or more history data, to indicate the relationship of a logical volume having a certain attribute among the plurality of logical volumes to an allocation destination candidate having a certain attribute among the one or more allocation destination candidates, to a third storage area; refining the plurality of logical volume data to one or more logical volume data based on the plurality of logical volume data, the allocation destination candidate data and the one or more history data; and outputting the content of the refined one or more logical volume data.

The volume refining system according to the third aspect of the present invention comprises the following (A) to (I), that is, (A) one or more computers (e.g. computer machine or such a processor as a CPU), (B) a storage area for registering a plurality of history data where at least one volume attribute element among the attributes on a logical volume and at least one allocation destination candidate attribute element among the attributes on a logical volume allocation candidates are associated, (C) a first computer program, that is a computer program to be executed by at least one of the one or more computers, for registering a plurality of logical volume data, where the attributes on the plurality of logical volumes are recorded respectively, to the storage area, (D) a second computer program, that is, a computer program to be executed by at least one of the one or more computers for registering a plurality of allocation destination candidate data, where the attributes on the plurality of allocation destination candidates are recorded respectively to the storage area, (E) a third computer program, that is a computer program to be executed by at least one of the one or more computers for providing an allocation destination candidate selection GUI for accepting the selection of a desired allocation destination candidate data from the plurality of allocation destination candidate data, (F) a fourth computer program, that is a computer program to be executed by at least one of the one or more computers for registering the allocation destination candidate data selected using the allocation destination candidate selection GUI to the storage area, (G) a fifth computer program, that is a computer program to be executed by at least one of the one or more computers for determining an evaluation value for each of the plurality of history data based on whether an allocation destination candidate attribute element matching with at least one of the plurality of allocation destination candidate attribute elements included in the selected allocation destination candidate data is included in each of the plurality of history data, (H) a sixth computer program, that is a computer program to be executed by at least one of the one or more computers, for determining the history data having an evaluation value matching predetermined conditions, among the determined plurality of evaluation values, as history data to be used for processing for refining the logical volume data, and (I) a seventh computer program, that is a computer program to be executed by at least one of the one or more computers, for refining the plurality of logical volume data to one or more logical volume data based on the plurality of logical volume data, the selected allocation destination candidate data and the determined history data, and outputting the content of the refined one or more logical volume data.

A volume refining method according to the fourth aspect of the present invention comprises steps of: storing a plurality of history data where at least one volume attribute element among the attributes on a logical volume and at least one allocation destination candidate attribute element among the attributes on logical volume allocation destination candidates are associated, to the storage area; receiving a plurality of logical volume data where the attributes on the plurality of logical volumes are recorded respectively, and registering the plurality of logical volume data to the storage area; receiving a plurality of allocation destination candidate data, where the attributes on the plurality of allocation destination candidates are recorded respectively, and registering the plurality of allocation destination candidate data to the storage area;

providing an allocation destination candidate selection GUI for accepting the selection of a desired allocation destination candidate data from the plurality of allocation destination candidate data; registering the allocation destination candidate data selected using the allocation destination candidate selection GUI to the storage area; determining an evaluation value for each of the plurality of history data, based on whether an allocation destination candidate attribute element matching at least one of the plurality of allocation destination candidate attribute elements included in the selected allocation destination candidate data exists in each of the plurality of history data; determining the history data having an evaluation value matching predetermined conditions, among the determined plurality of evaluation values, as history data to be used for processing for refining the logical volume data; refining the plurality of logical volume data to one or more logical volume data based on the plurality of logical volume data, the selected allocation destination candidate data and the determined history data; and outputting the content of the refined one or more logical volume data.

A computer system according to the fifth aspect of the present invention is a system for writing data to one logical volume among a plurality of logical volumes or reading data from the logical volume, comprising: one or more computers; an application program to be executed by at least one of the one or more computers; an application interface program, that is a computer program to be executed by at least one of the one or more computers and to be an interface for an application program; a command issuing program, that is a computer program to be executed by at least one of the one or more computers, for issuing a command to a logical volume; a first monitoring program, that is a computer program to be executed by at least one of the one or more computers, for monitoring an application interface unit; a second monitoring program, that is a computer program to be executed by at least one of the one or more computers, for monitoring a command issuing unit; a third monitoring program, that is a computer program to be executed by at least one of the one or more computers, for communicating with the first monitoring program and the second monitoring program; an application access storage area for storing information on the access of the application interface unit; and a command access storage area for storing information on the access of the command issuing unit. The application interface program receives a write request or read request of data from one of the one or more application programs, outputs the received write request or read request, and receives write data, which is a write target, from the application program which is the write request issuing source, and outputs the write data to the command issuing unit, or receives read data, which is a read target, and which was output from the command issuing unit, and outputs the read data to the application program which is the read request issuing source. The command issuing program receives the write request or read request which was output, and selects the logical volume to be a destination from the plurality of logical volumes according to the write request or read request, generates and outputs a write command or read command for the selected logical volume, and outputs the write data to the logical volume, or receives the read data from the logical volume responding to the read command, and outputs the read data to the application interface program. The first monitoring program, that is a resident program of the application interface program, acquires the application identification information of the application program which issued a write request or read request to the application interface program, acquires first data content, which is a content of the write data or read data received by the application interface program, and notifies the acquired application identification information and the first data content to the third monitoring program. The second monitoring program, that is a resident program of the command issuing program, acquires the logical volume identification information of a logical volume to be a destination of the write command or read command which was output by the command issuing program, acquires a second data content, which is a content of the write data or read data received by the command issuing program, and notifies the acquired logical volume identification information and the second data content to the third monitoring program. The third monitoring program writes the application identification information and the first data content notified by the first monitoring program to the application access storage area, writes the logical volume identification information and the second data content notified by the second monitoring program to the command access storage area, detects that the written first data content and second data content match, acquires the application identification information corresponding to the matched first data content from the application access storage area, acquires the application identification information corresponding to the matched second data content from the command access storage area, and generates and outputs the access relationship data including the acquired application identification information and logical volume identification information.

For the above mentioned logical volume identification information, various information that can uniquely specify the logical volume, such as a logical path name connected to the logical volume and the logical volume identifier, can be used.

According to the present invention, the burden on the individual who selects at least one logical volume from a plurality of volumes decreases.

BRIEF DESCRIPTION OF THE DRAWINGS

FIG. 2 shows an example of the operational host configuration data 13;

FIG. 3A shows an example of the storage configuration data 13, FIG. 3B shows a configuration example of the port information included in the operational host configuration data 13, FIG. 3C shows a configuration example of the logical volume information included in the operational host configuration data 13, and FIG. 3D shows a configuration example of the path information included in the operational host configuration data 13;

FIG. 4A shows a configuration example of the parameter list data 61, FIG. 4B is a configuration example of the logical volume list data 63, and FIG. 4C shows a configuration example of the history data 65;

FIG. 13A shows a concrete configuration example of the parameter list data 61, and FIG. 13B shows a concrete configuration example of the logical volume list data 63;

FIG. 14A-FIG. 14F shows the flow of the update of the history data 65;

FIG. 16A shows a configuration example of the OS-API access table 117, FIG. 16B shows a configuration example of the logical volume access table 119, and FIG. 16C shows a configuration example of the relationship table 121;

FIG. 18A shows concrete configuration examples of the OS-API access table 117, logical volume access table 119 and relationship table 121; and FIG. 19 shows a configuration example of the history data 65 generated based on the relationship table 121 shown in FIG. 18A.

DESCRIPTION OF THE PREFERRED EMBODIMENTS

An embodiment of the present invention will now be described with reference to the drawings.

EXAMPLE 1

Figure 1:
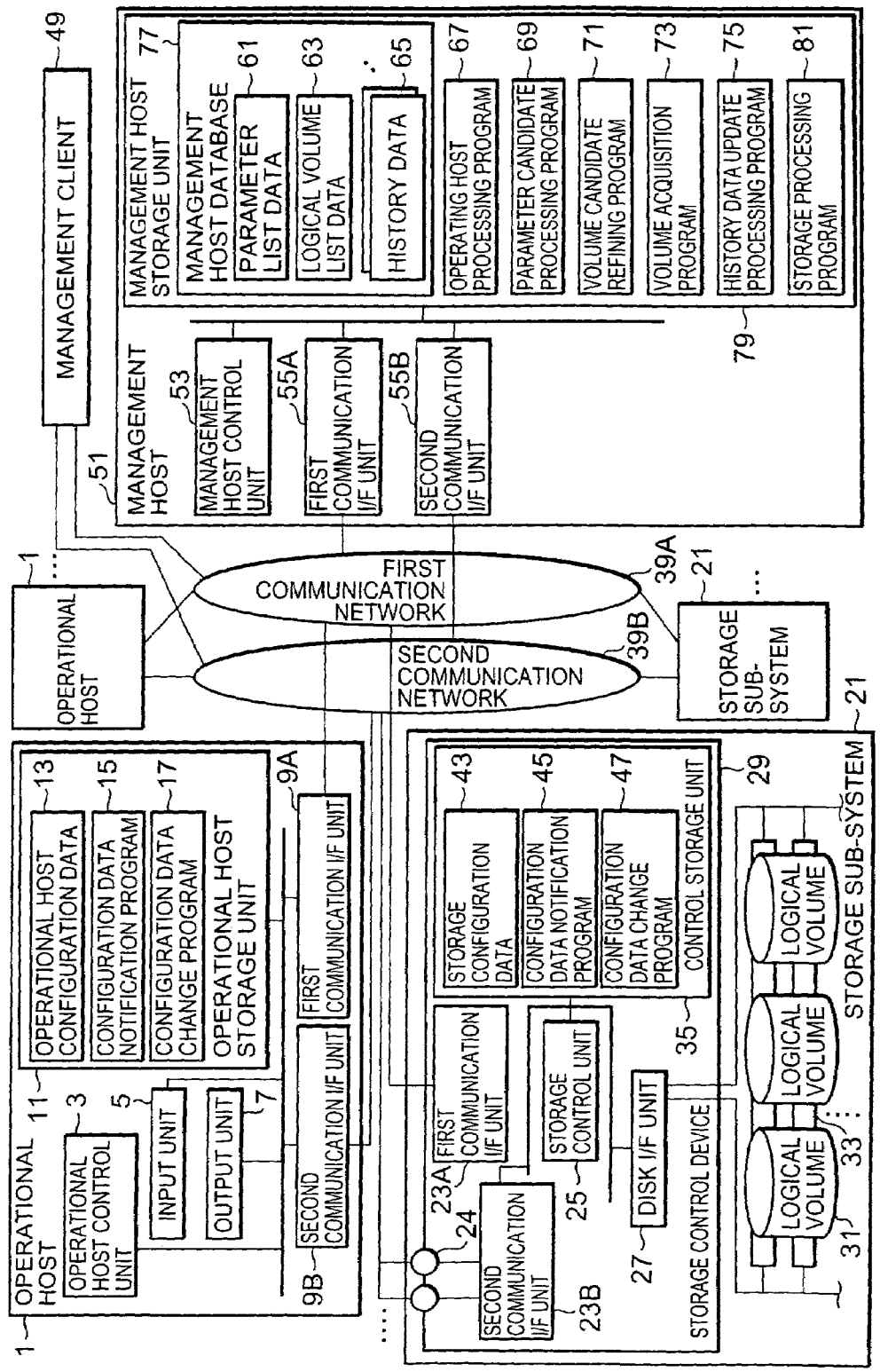
FIG. 1 is a diagram depicting a configuration of the computer system according to the first example of an embodiment of the present invention.

FIG. 1 shows a configuration example of the computer system according to the first example of an embodiment of the present invention. In the following description, "interface" may be abbreviated to "I/F".

One or a plurality of operational hosts 1, 1, . . . , one or a plurality of storage sub-systems 21, 21, . . . , one or more management hosts 51, and one or more management clients 49 are connected to both the first communication network 39A and the second communication network 39B. The first communication network 39A is a communication network conforming to IP protocol, for example, such as a LAN (Local Area Network) or the Internet. The second communication network 39B, on the other hand, is a different type of communication network from the first communication network 39A, such as a SAN (Storage Area Network). The types of communication networks are not limited to these two types, 39A and 39B, but may be one type or three or more types.

The operational host 1 is a computer, such as a personal computer, workstation, server machine or main frame, for example. The operational host 1 communicates with the management host 51, for example, to notify various configuration information (e.g. later mentioned operational host configuration data) of the operational host 1 to the management host 51, or to change the configuration to use the later mentioned logical volume 31 of the storage sub-system 21 according to a request from the management host 51. The operational host 1 is comprised of the input unit 5 (e.g. keyboard, pointing device), output unit 7 (e.g. display device), operational host storage unit 11 (e.g. memory and/or hard disk), operational host control unit 3 (e.g. one or more processors, such as a CPU), first communication I/F unit 9A (e.g. LAN card) to be connected to the first communication network 39A, and second communication I/F unit 9B (e.g. host bus adapter of fiber channel) to be connected to the second communication network 39B.

The operational host storage unit 11 stores the operational host configuration data 13 on the configuration of the operational host 1, the computer program 15 to processing the notification of the operational host configuration data 13 (hereafter called configuration data notification program 15), and the computer program 17 to process the change of the content of the operational host configuration data 13 (hereafter called configuration data change program 17). Also the operational host storage unit 11 may store the operating system (hereafter OS) of the operatial host 1 and one or a plurality of application programs which run on the OS (hereafter may simply be called application), however these are not shown in the drawing.

The operational host control unit 3 sends a write command for writing data to the later mentioned logical volume 31 (e.g. write command based on SCSI protocol), data, and a read command for reading the data from the logical volume 31 (e.g. read command based on SCSI protocol) to the storage sub-system 21 via the second communication I/F unit 9B (or first communication I/F unit 9A) (hereafter "I/O command" is used when at least one of the write command and read command is referred to). The operational host control unit 3 also generates the operational host configuration data 13 based on the information held by the OS, and stores it in the operational host storage unit 11. The operational host control unit 3 also acquires the operational host configuration data 13 from the operational host storage unit 11 by reading the configuration data notification program 15, and notifies all or a part of the content of the data 13 to the management host 51 via the first communication I/F unit 9A or second communication I/F unit 9B. The operational host control unit 3 also changes the content of the operational host configuration data 13 based on the information held by the OS by reading the configuration data change program 17. The "information held by the OS" can be stored in the operating host storage unit 11, for example, and this information includes, for example, one or a plurality of user identifiers (e.g. names) of the operational host 1, one or a plurality of application identifiers (e.g. names) installed on the operational host 1, and the identifier (e.g. name) of the operational host 1 itself. This information may include, for example, information of the relationship of a user and an application the user will use (e.g. table where the user name and application name are associated).

The storage sub-system 21 is comprised of a plurality of disk drives (e.g. hard disk drives) 33, a plurality of logical storage devices (hereafter called logical volumes) 31 provided on these disk devices 33, and the storage control device 29 for controlling writing and reading data to/from the plurality of logical volumes 31. For the storage system 21, a RAID (Redundant Array of Inexpensive Disks) system, for example, can be used.

The storage control device 29 communicates with the management host 51, for example, to notify various configuration information (e.g. later mentioned storage configuration data 43) of the storage sub-system 21 to the management host 51, or to change the configuration (e.g. change of storage configuration data 43) to allocate the logical volumes 31 to the operational host 1 according to a request from the management host 51. The storage control device is comprised of the first communication I/F unit 23A to be connected to the first communication network 39A and second communication I/F unit 23B having one or more communication ports 24 that can be connected to the second communication network 39B. The storage control device 29 further comprises the disk I/F unit 27, control storage unit 35 (e.g. memory and/or hard disk) and storage control unit 25 (e.g. one or more processors, such as a CPU).

The disk I/F unit is connected to a plurality of physical disk devices 33, and can access one logical volume 33 among the plurality of logical volumes 31 by accessing at least one disk device 33 among the physical disk devices 33.

The control storage unit 35 stores the storage configuration data 43 on the configuration of the storage sub-system, the computer program 45 to process the notification of the storage configuration data 43 (hereafter called configuration data notification program 45), and the computer program 47 to process the change of content of the storage configuration data 43 (hereafter called configuration data change program 47). The storage configuration data 43 includes logical volume attributes (e.g. identifier (e.g. number) and RAID type) on each of the plurality of logical volumes 31 that the storage sub-system 21 has, for example.

The storage control unit 25 receives an I/O command from the operational host 1 via one of one or more communication port 24 and second communication I/F unit 23B (or first communication I/F unit 23A). The storage control unit 25 writes the data received from the operational host 1 to the logical volume 31 or reads the data from the logical volume 31 and returns it to the operational host 1 via the disk I/F unit 27 according to the I/O command. The storage control unit 25 acquires the storage configuration data 43 from the control storage unit 35 by reading the configuration data notification program 45 and notifies all or part of the content indicated by the data 43 to the management host 51 via the first communication I/F unit 23A or second communication I/F unit 23B. The storage control unit 25 changes the content of the storage configuration data 43 based on the information which is input from the outside (e.g. access path name for each logical volume 31) for example, by reading the configuration data change program 47.

The management host 51 is a computer, such as a personal computer, workstation, server machine or main frame. The management host 51 communicates with the operational host 1, for example, to acquire the various configuration information of the operational host 1 from the operational host 1, or to request the operational host 1 to execute a configuration change to use the logical volume 31 of the storage sub-system 21. The management host 51 can also communicate with the storage sub-system 21 to acquire the various configuration information of the storage sub-system 21 from the storage sub-system 21 or to request the storage sub-system to execute a configuration change to allocate the logical volume 31 to the operational host 1. The management host 51 is comprised of the management host storage unit 79 (e.g. memory and/or hard disk), management host control unit 53 (e.g. one or more processors, such as a CPU), first communication I/F unit 55A (e.g. LAN card) to be connected to the first communication network 39A, and second communication I/F unit 55B (e.g. host bus adapter of fiber channel) to be connected to the second communication network 39B.

In the management host storage unit 79, the database 77 (hereafter called management host database 77) is constructed. The management host database 77 stores the parameter list data 61, logical volume list data 63 and one or more history data 65. In the logical volume list data 63, the logical volume data for each of the plurality of logical volumes is stored. Each data, 61, 63 and 65, will be described later.

The management host storage unit 79 stores the computer program for processing the data received from the operational host 1 (hereafter called operational host processing program) 67, the computer program for processing the later mentioned parameter candidates (hereafter called parameter candidate processing program) 69, and the computer program for refining at least one candidate from a plurality of logical volumes 31 (hereafter called volume candidate refining program) 71. Also the management host storage unit 79 stores the computer program to process for acquiring the logical volume list data 63 (hereafter called volume acquisition program) 73, the computer program for performing update processing of history data 65 (hereafter called history data update processing program) 75, and the computer program for processing the data received from the storage sub-system 21 (hereafter called storage processing program) 81.

The management host control unit 53 executes processing according to the program that was read by reading the various computer programs 67, 69, 71, 73, 75 and 81. Processing to be executed by the management host control unit 53 will be described later.

The management client 49 is a computer, such as a personal computer, workstation and main frame. For the configuration of the management client 49, which is not illustrated, the configuration of a general computer machine comprising a processor (e.g. CPU), memory and hard disk, for example, can be used.

The above is an overview of a configuration example of the computer system according to the first embodiment. The above configuration is merely an example, and the present invention need not be the above configuration. For example, the management client 49 and management host 51 need not be separate.

Now the composing elements of the above mentioned computer system will be described.

FIG. 2 shows an example of the operational host configuration data 13.

Data elements of the operational host configuration data 13 are, for example, a host name, application name/user name and flag. The host name is a name of the operational host 1, but any identifier, not limited to a name, can be used if the identifier can specify the operational host 1. This is the same for the application name/user name (at least one of application name and user name). The flag is a data element to indicate whether the application name/user name indicates the application name or the user name. For example, if the application name is indicated, the flag becomes "APPLICATION", and if the user name is indicated, the flag becomes "USER".

The operational host configuration data 13 can be generated by the operational host control unit 1 based on the information held by the OS of the operational host 1. This operational host configuration data 13 may be information held by the OS itself.

FIG. 3A shows an example of the storage configuration data 13.

The storage configuration data 13 includes port information, logical volume information and path information. The port information is information on the configuration of the communication port 24 (e.g. fiber channel port) in the storage sub-system 21. The logical volume information is information on the configuration of the plurality of logical volumes 31 that the storage sub-system 21 has. And the path information is information on the path (connection) of the communication port 24 and the logical volume 31.

FIG. 3B shows a configuration example of the port information included in the operational host configuration data 13.

The port information 43A includes attribute data for each communication port 24. The attribute data of the communication port 24 includes a port identifier, topology and port WWN, for example. The port identifier of the communication port 24 is information for uniquely specifying which one of the plurality of communication ports 24 the communication port 24 is. The topology of the communication port 24 is information for indicating the configuration of the network which is connected to the communication port 24. And the port WWN of the communication port 24 is the WWN (World Wide Name) of the communication port 24.

FIG. 3C shows a configuration example of the logical volume information included in the operational host configuration data 13.

The logical volume information 43B includes attribute data for each logical volume 31. The attribute data of the logical volume 31 includes the logical volume identifier, logical volume capacity, RAID type and redundancy flag, for example. The logical volume identifier of the logical volume 31 is information for uniquely specifying which one of the plurality of logical volumes 31 the logical volume 31 is. The logical volume capacity of the logical volume 31 is information to indicate the storage capacity of the logical volume 31. The RAID type of the logical volume 31 is information to indicate the RAID type (e.g. RAID level, such as RAID0 or RAID5) of the logical volume 31. The redundancy flag of the logical volume 31 is information to indicate whether another logical volume, which is a copy of the logical volume 31, exists in the same storage sub-system 21 or in another storage sub-system 21.

FIG. 3D shows a configuration example of the path information included in the operational host configuration data 13.

The path information 43C includes the attribute data on each of a plurality of logical paths formed in the storage sub-system 21 (hereafter called logical paths). The attribute data of the logical path includes the path identifier, port identifier and logical volume identifier. The path identifier of the logical path is information for uniquely specifying which one of the plurality of logical paths the logical path is. The port identifier of the logical path is information for uniquely specifying which one of the plurality of communication ports 24 the communication port 24 connected to the logical path is. The logical volume identifier of the logical path is information for uniquely specifying which one of the plurality of logical volumes 31 the logical volume 31 connected to the logical path is.

The attribute data of the logical path may also include data on the allocation destination to which the logical path is allocated (in other words, the allocation destination of the logical volume connected to the logical path) (for example, the host name of the operational host 1, or a combination of the host name and user name and/or application name).

FIG. 4A shows a configuration example of the parameter list data 61.

The parameter list data 61 includes one or more parameter data. Each parameter data includes a host name, application name/user name and flag, for example. The management host control unit 53 can judge the names of applications or users registered in the operational host 1, by referring to each parameter data, for example. The meanings of the host name, application name/user name and flag are as described with reference to FIG. 2.

All or a part of each parameter data may be actively and periodically (or non-periodically) notified from the operational host 1 to the management host 51, or may be notified from the operating host 1 to the management host 51 as a response to an inquiry which is issued from the management host 51 to the operational host 1. Parameter data is data that is acquired from the operational host configuration data 13.

FIG. 4B shows a configuration example of the logical volume list data 63.

The logical volume list data 63 includes one or more logical volume data. Each logical volume data includes the attributes on a certain logical volume 31, for example, such as the logical volume identifier, logical volume capacity, RAID type and redundancy flag.

All or a part of each logical volume data may be actively and periodically (or non-periodically) notified from the storage sub-system 21 to the management host 51, or may be notified from the storage sub-system 21 to the management host 51 as a response to an inquiry which is issued from the management host 51 to the storage sub-system 21. The logical volume data is data that is acquired from the logical volume information of the storage configuration data 43, for example.

FIG. 4C shows a configuration example of the history data 65.

In the history data 65, information on the relationship of a logical volume 31 and an operational host 1 (or a user or application of the operational host 1) to which the logical volume 31 is allocated to is registered. Specifically, the attributes on the allocated (e.g. selected by the administrator) logical volume 31 and attributes on the operational host 1 at the allocation destination of the logical volume 31, for example, are included. More specifically, one history data 65 is data which corresponds to one logical volume 31, and in the history data 65, the date and time, host name, user name, application name, logical volume capacity, RAID type and redundancy flag are registered. The date and time is the date and time when the logical volume 31 is allocated to the operational host 1 (in other words, the date and time when the administrator selected the logical volume to be the allocation target), and this can be acquired and registered by the timer, which is not shown in the drawings, of the management host 51. The host name is a name of the operational host 1 at the allocation destination of the logical volume 31, and the user name is a name of one or more users of the operational host 1 (in other words, the allocation destination of the logical volume 31), and the application name is a name of one or more applications of the operational host 1 (in other words, the allocation destination of the logical volume 31). The logical volume capacity is a storage capacity of the allocated logical volume 31, the RAID type is a RAID type of the logical volume 31, and the redundancy flag is a redundancy flag of the logical volume 31.

Figure 5:
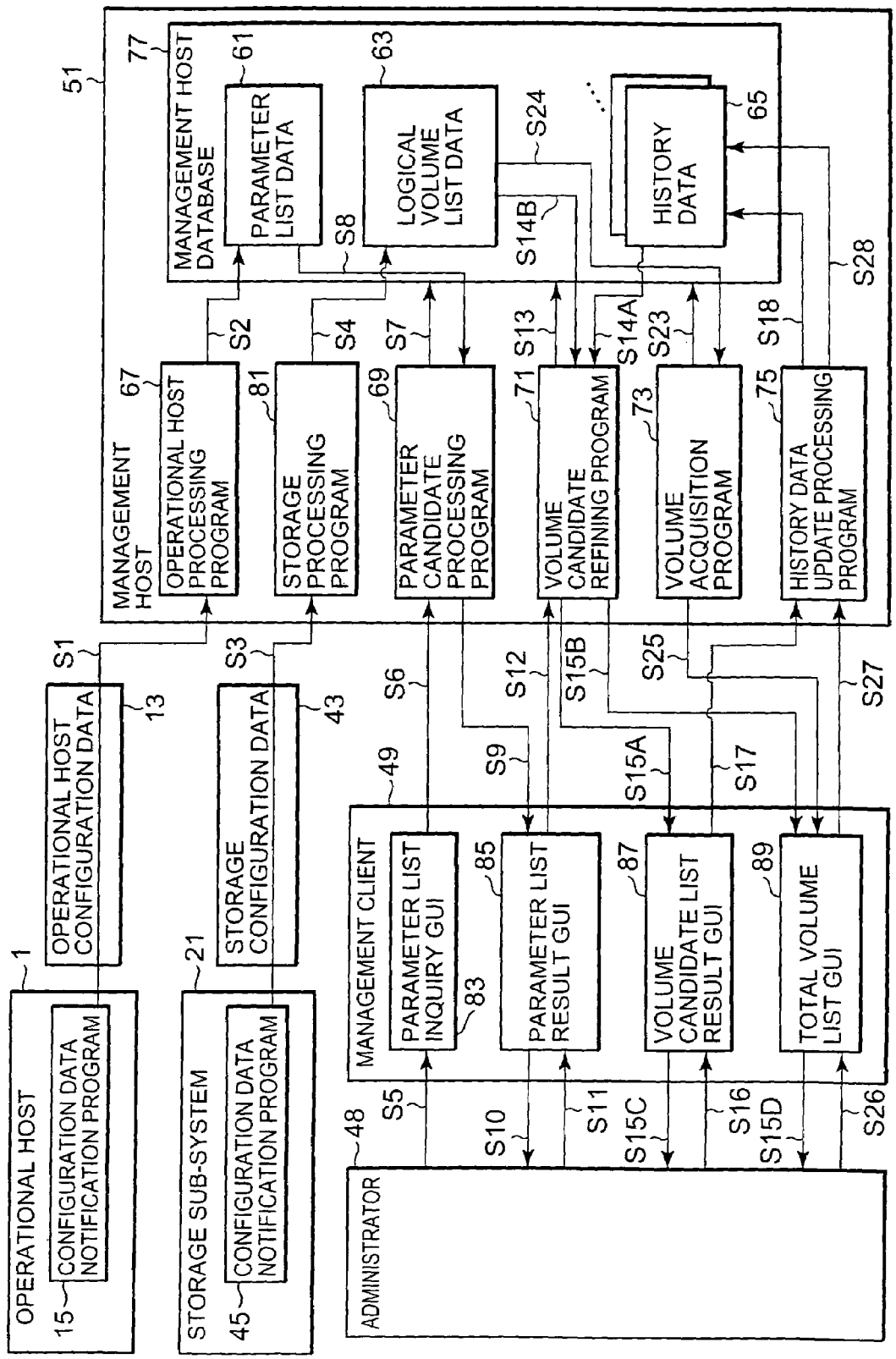
FIG. 5 is a diagram depicting an overview of the processing flow which is executed in the computer system according to the first example of the embodiment of the present invention.

FIG. 5 shows an overview of the processing to be executed by the computer system according to this first example. This processing will now be described with reference to FIG. 5.

The configuration data notification program 15, which was read by the operational host control unit 3, acquires the operating host configuration data 13 from the operational host storage unit 11 periodically or non-periodically, actively or as a response to an inquiry from the management host 51, and notifies the operational host configuration data 13 to the management host 51 (step S1). The operational host processing program 67, which was read by the management host control unit 53, acquires one or more parameter data from the received operational host configuration data 13, and registers the acquired one or more parameter data to the parameter list data 61 in the management host data base 77 (S2). By repeating these processings, S1 and S2, all or a part of the parameter list data 61 is updated (e.g. added, changed or deleted). In the parameter list data 61, only the latest one or more parameter data for each operational host 1 may remain and an old parameter data may be deleted, or an old parameter data may also remain as history.

The configuration data notification program 45, which was read by the storage control unit 25, acquires the storage configuration data 43 from the control storage unit 35 periodically or non-periodically, actively or as a response to an inquiry from the management host 51, and notifies the storage configuration data 43 (or logical volume information 43B, which is a part of the storage configuration data 43) to the management host 51 (S3). The storage processing program 81, which was read by the management host control unit 53, acquires one or more logical volume data from the received storage configuration data 43, and registers the acquired one or more logical volume data to the logical volume list data 63 in the management host database 77 (S4). By repeating these processings in S3 and S4, all or a part of the logical volume list data is updated. In the logical volume list data 63, only the latest one or more logical volume data for each logical volume 31 may remain and old logical volume data may be deleted, or old logical volume data may also remain as history.

The administrator 48 uses the management client 49, for example. On the display device, which is not in the drawing, of the management client 49, various GUIs provided by the management host 51 are displayed. When the management client 49 receives a specific operation from the administrator 48, for example, the management client 49 can access the management host 51, and display the parameter list inquiry GUI 83 provided from the management host. The parameter list inquiry GUI 83 includes the inquiry acceptance tool for accepting an inquiry from the administrator 48, and a program for issuing the parameter list data inquiry to the management host 51 when the tool is operated.

The administrator 48 inputs a parameter list inquiry to the parameter list inquiry GUI 83 (e.g. operates the inquiry acceptance tool) (S5). The management client displaying the parameter list inquiry GUI 83 responds to this input and issues the inquiry of the parameter list data to the management host 51 (S6). The parameter candidate processing program 69, which was read by the management host control unit 53, accesses the management host database 77 (S7), and acquires the parameter list data 61 from the management host database 77 (S8). And the parameter candidate processing program 69 generates the parameter list result GUI 85 where the content of the acquired parameter list data 61 is stored, and provides the GUI 85 to the management client 49 (S9). The parameter list result GUI 85 is configured such that the selection of the parameter data desired by the administrator 48 from a plurality of parameter data constituting the parameter list data can be accepted (e.g. a plurality of check boxes corresponding to a plurality of parameter data respectively are provided). The management client 49 displays the received parameter list result GUI 85 (S10), and waits for input from the administrator 48.

When the management client 49 receives input from the administrator 48 on selection of the parameter data desired by the administrator 48 from a plurality of parameter data constituting the parameter list data 61 (S11), the management client 49 notifies the parameter data corresponding to this input to the management host 51 (S12) The volume candidate refining program 71, which was read by the management host control unit 53, responds to the notification from the management client 49 and accesses the management host database 77 (S13), reads one or more history data 65 (S14A), and reads the logical volume list data (S14B). And the volume candidate refining program 71 executes retrieval processing to retrieve one or more logical volume data corresponding to one or more logical volumes 31 to be the candidates of the allocation target from the one or more history data and logical volume list data 63 which were read, using the parameter data received by the processing in S12 as a retrieval key. The parameter data which was used as the retrieval key may be set in a predetermined storage area of the management host storage unit 79 to perform update processing of the history data 65.

If the result is a retrieval hit in the above retrieval processing (that is one or more logical volume data, as mentioned above, was acquired), the volume candidate refining program 71 generates the volume candidate list result GUI 87 where the content of the acquired one or more logical volume data is stored, and provides the GUI 87 to the management client 49 (S15A). If the result is not a retrieval hit in the above retrieval processing, on the other hand (that is one or more logical volume data, as mentioned above, was not acquired), then the volume candidate refining program 71 generates the total volume list GUI 89 where the content of the logical volume list data 63, which was read by the processing in S14B, is stored, and provides this GUI 89 to the management client 49 (S15B). Both the volume candidate list result GUI 87 and the total volume list GUI 89 are constructed such that the selection of the logical volume data desired by the administrator 48 among one or more logical volume data can be accepted (e.g. a plurality of check boxes which correspond to a plurality of logical volume data respectively are provided). The management client 49 displays the received GUI 87 or GUI 89 (S15C or S15D), and waits for input from the administrator 48.

When the management client 49 receives input from the administrator 48 on the selection of the logical volume data desired by the administrator 48 from one or more retrieved (that is, refined) logical volume data via the volume candidate list result GUI 87 (S16), the management client 49 notifies the logical volume data corresponding to this input to the management host 51 (S17). In the same way, when the management client 49 receives input from the administrator 48 on the selection of the logical volume data desired by the administrator 48 from a plurality of logical volume data constituting the logical volume list data 63 via the total volume list GUI 89 (S26), the management client 49 notifies the logical volume data corresponding to this input to the management host 51 (S27).

The history data update processing program 75, which was read by the management host control unit 53, updates the history data 65 in the management host database 77 based on the logical volume data received from the management client 49 and the parameter data used as the above retrieval key (this can be acquired from the above mentioned predetermined storage area, for example) (S18 or S28). Specifically, the history data update processing program 75 removes the logical volume identifier from the above mentioned received logical volume data, for example, removes the flag from the parameter data which was used as the above mentioned retrieval key, generates a new history data 65 based on a plurality of data elements in the logical volume data and parameter data which remains after removal and the date and time when the logical volume data desired by the administrator 48 was selected, and registers the new history data 65 in the management host data base 77.

When the volume acquisition program 73, which was read by the management host control unit 53, receives a volume list inquiry from the administrator 48 via the management client 49, for example, the volume acquisition program 73 can access the management host database 77 (S23), reads the logical volume list data 63 from the database 77 (S24), generates the total volume list GUI 89 where the content of the data 63 is stored, and provides the GUI 89 to the management client 49 (S25).

The management host 51 can also allocate the logical volume 31, which is indicated by the logical volume data selected by the administrator 48, to the allocation target indicated by the parameter data selected by the administrator 48 (for example, operational host 1 or a combination of the operation host 1 and user/application), although this is not shown in the drawing. Specifically, the management host 51 sends at least the logical volume identifier among the logical volume data selected by the administrator 48 and all or a part of the parameter data selected by the administrator 48 to the storage sub-system 21, for example. The storage control device 29 of the storage sub-system 21 performs processing to allocate the logical volume 31 selected by the administrator 48 to the allocation target selected by the administrator 48 based on the logical volume identifier received from the management host 51 and all or a part of the parameter data. For example, the storage control device 29 may specify the communication port 24 that the allocation destination can access and the allocation target logical volume 31 by referring to the storage configuration data 43 using the received logical volume identifier and all or a part of the parameter data, form a logical path between the specified communication port 24 and the logical volume 31, and register the attribute data on that logical path in the path information 43C. In order to specify the communication port 24 which the allocation destination can access, the host names of the operational host 1, which can access the communication port 24 (or a combination of the host name and application name and/or user name) may be recorded for the identifier of each communication port 24 in the storage configuration data 43. Also, as mentioned above, the date and time when the management host 51 sent the logical volume identifier, etc. to the storage sub-system 21 may be regarded as the date and time when the logical volume was allocated (that is, the date and time registered in the history data 65).

Also in the above processing, each storage sub-system 21 may notify its own identifier (e.g. IP address and its own name) to the management host 51 along with the storage configuration data 43, so as to specify a logical volume and a storage sub-system that has the logical volume among the plurality of storage sub-systems.

The above is an overview of the processing to be executed by the computer system according to the first embodiment. Now the processing to be executed by each of the above mentioned computer programs will be described.

Figure 6:
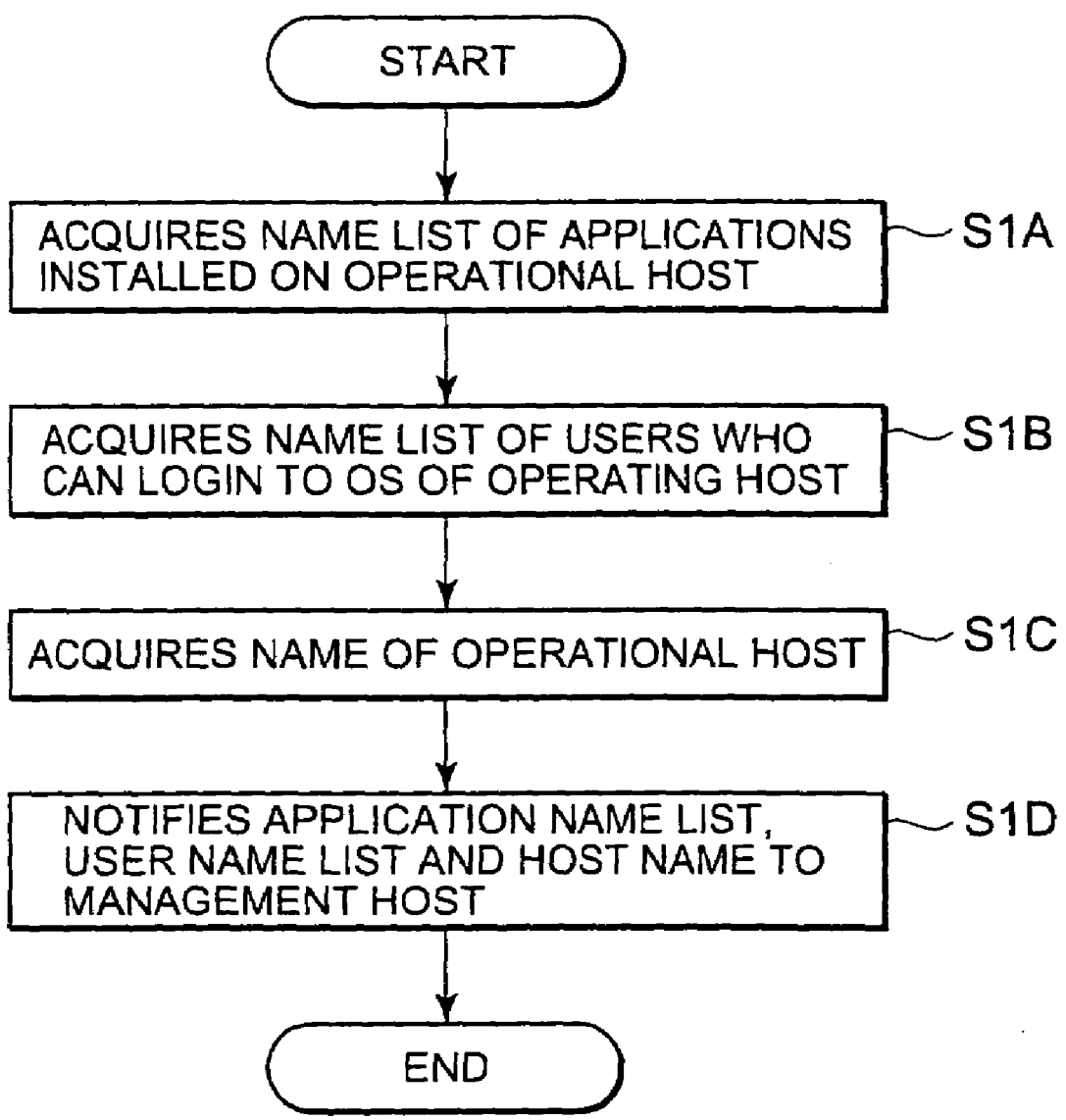
FIG. 6 is a flow chart depicting an example of the processing flow which is executed by the configuration data notification program 15 in the operational host 1.

FIG. 6 shows an example of the processing flow to be executed by the configuration data notification program 15 in the operational host 1.

The configuration data notification program 15 acquires the name list of the applications which have been installed on the operational host 1 from the information held by the OS, for example (S1A). The configuration data notification program 15 also acquires the name list of the users who can login to the OS of the operational host 1 from the information held by the OS, for example (S1B). The configuration data notification program 15 also acquires the name of the operational host 1 from the information held by the OS, for example (S1C). By the above S1A-S1C, the operational host configuration data 13 is constructed.

The configuration data notification program 15 notifies the constructed operational host configuration data 13, that is, the application name list, user name list and host name, to the management host 51 (S1D).

The configuration data notification program 15 may be started up by receiving a startup instruction from the OS periodically or non-periodically, and execute processing in S1A-S1D. The operational host configuration data 13 may be generated and stored in the operational host storage unit 11 by a different program than this notification program 15, and the notification program 15 may simply read the operational host configuration date 13, and notify it to the management host 51.

Figure 7:
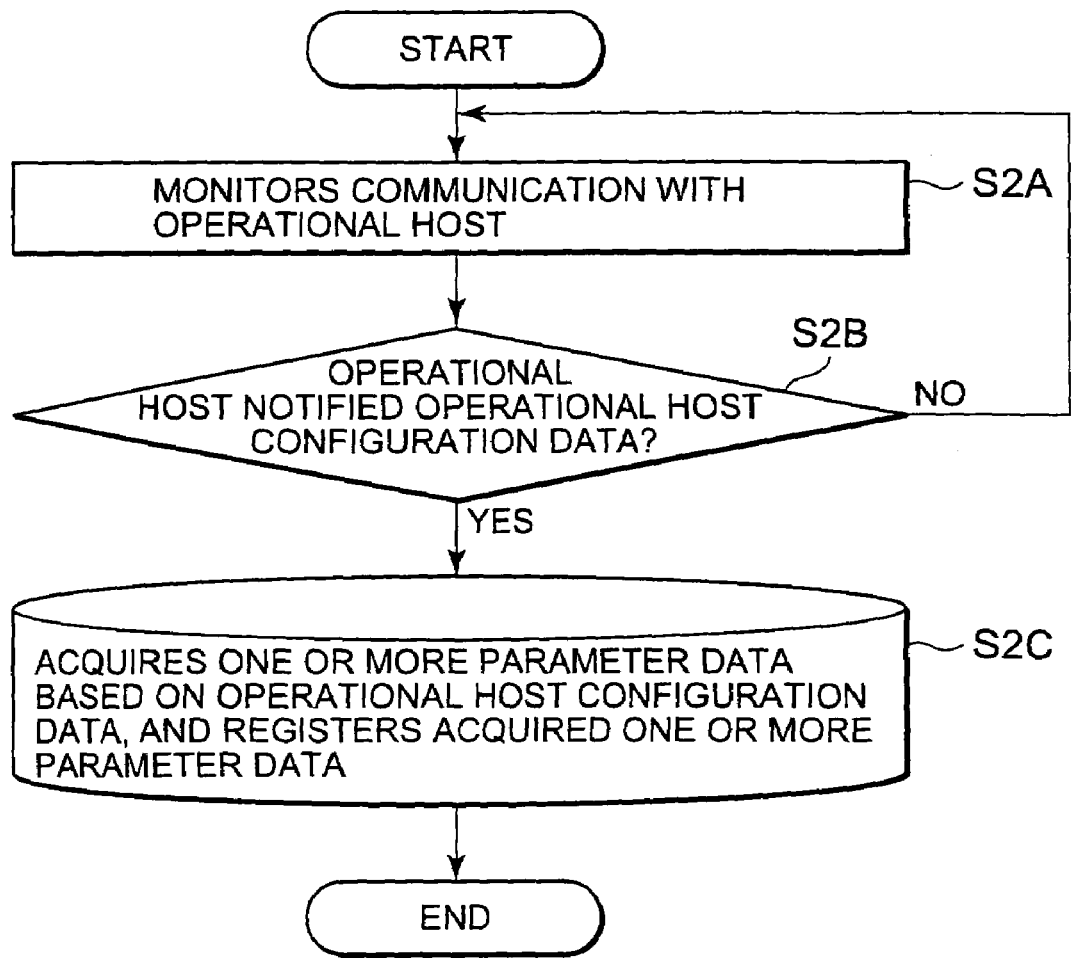
FIG. 7 is a flow chart depicting an example of the processing flow which is executed by the operational host processing program 67 in the management host 51.

FIG. 7 shows an example of the processing flow to be executed by the operational host processing program 67 in the management host 51.

The operational host processing program 67 monitors the communication with the operational host 1 (S2A), and if the operational host configuration data 13 is notified from the operational host 1 (YES in S2B), the operational host processing program 67 acquires one or more parameter data based on the data 13 by processing the data 13 if necessary, and registers the acquired one or more parameter data in the parameter list data 61 of the management host database 77 (S2C).

Figure 8:
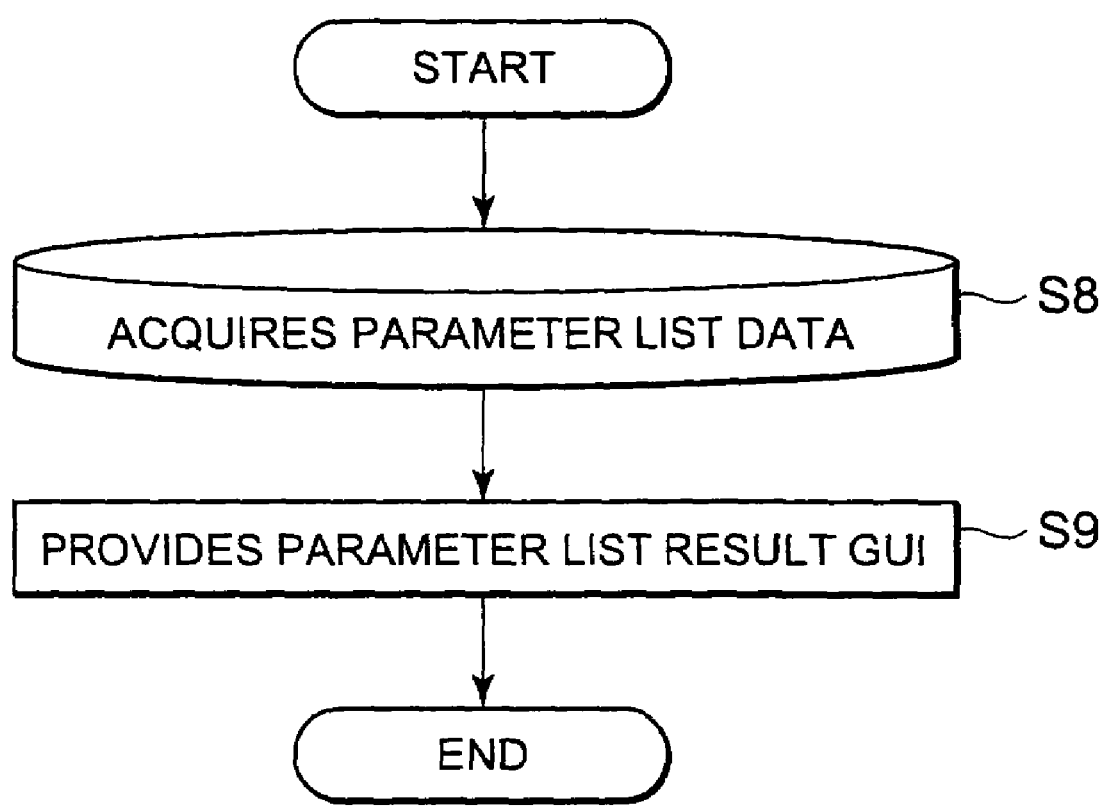
FIG. 8 is a flow chart depicting an example of the processing flow which is executed by the parameter candidate processing program 69 in the management host 51.

FIG. 8 shows an example of the processing flow to be executed by the parameter candidate processing program 69 in the management host 51.

The parameter candidate processing program 69 accesses the management host database 77 and acquires the parameter list data 61 from the management host database 77 (S8). The parameter candidate processing program 69 generates the parameter list result GUI 85 where the content of the acquired parameter list data 61 is stored, and provides the GUI 85 to the management client 49 (S9).

Figure 9:
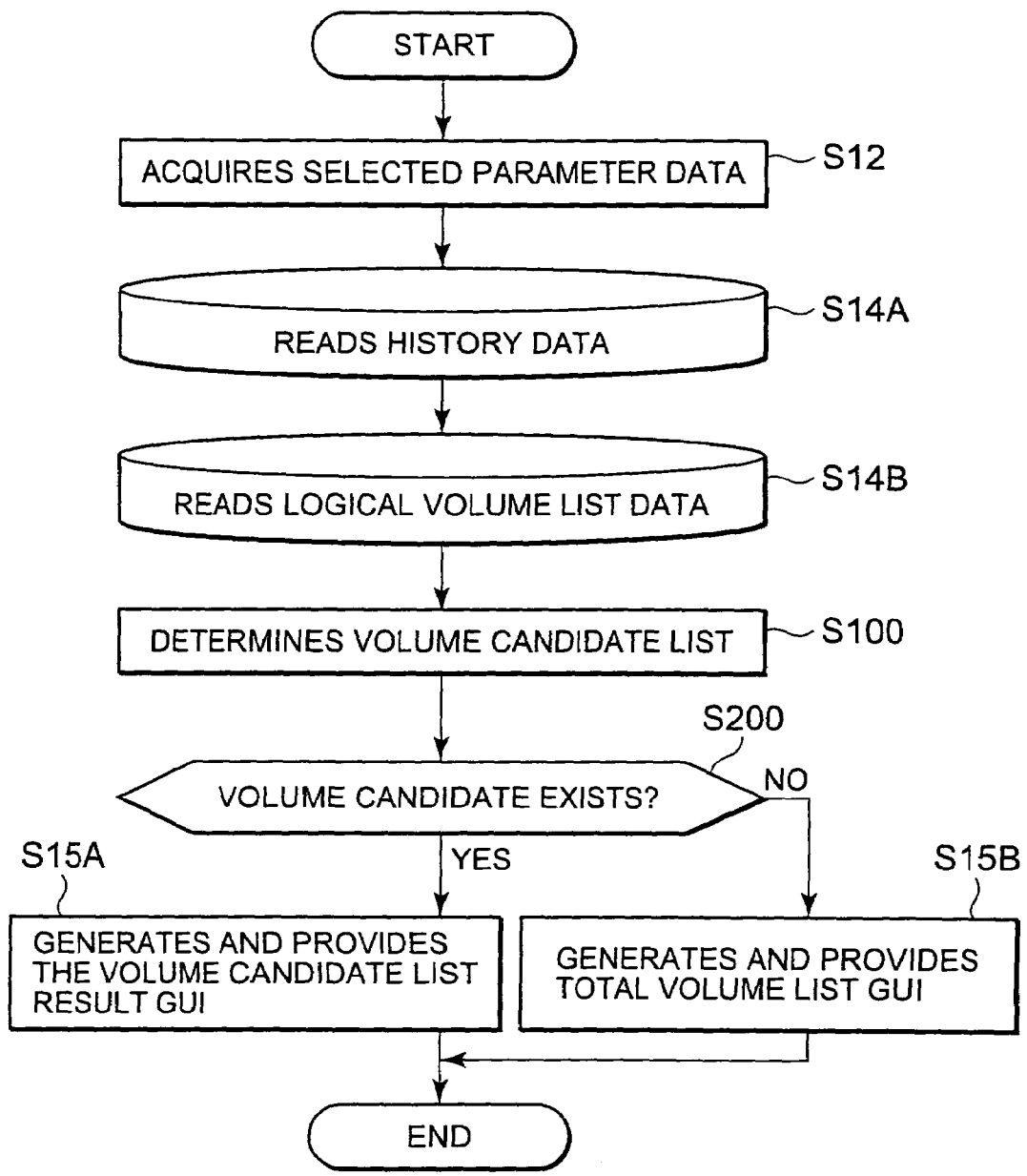
FIG. 9 is a flow chart depicting an example of the processing flow which is executed by the volume candidate refining program 71 in the management host 51.

FIG. 9 shows an example of the processing flow to be executed by the volume candidate refining program 71 in the management host 51.

The volume candidate refining program 71 acquires the parameter data selected by the administrator 48 from the management client 49 (S12), and reads one or more history data 65 and the logical volume list data 63 from the management host database 77 (S14A and S14B). And the volume candidate refining program 71 determines one or more logical volumes 31 to be the candidates of the allocation target, that is the volume candidate list, based on the parameter data which was acquired by the processing in S12 and the one or more history data 65 and the logical volume list data 63 which were read (S100). Specifically, the volume candidate refining program 71, for example, executes the retrieval processing to retrieve one or more logical volume data corresponding to the one or more logical volumes 31 to be the allocation target candidates respectively from the one or more history data 65 and the logical volume list data 63 which were read, using the parameter data acquired by the processing in S12 as a retrieval key.

If the volume candidate list can be determined by the processing in S100 (YES in S200), the volume candidate refining program 71 generates the volume candidate list result GUI 87 where the content of the determined volume candidate list (that is, one or more logical volume data acquired) is stored, and provides this GUI 87 to the management client 49 (S15A).

If the volume candidate list cannot be determined by the processing in S100, on the other hand (NO in S200), the volume candidate refining program 71 generates the total volume list GUI 89 where the content of the logical volume list data 63 which was read by the processing in S14B is stored, and provides this GUI 89 to the management client 49 (S15B).

Figure 10:
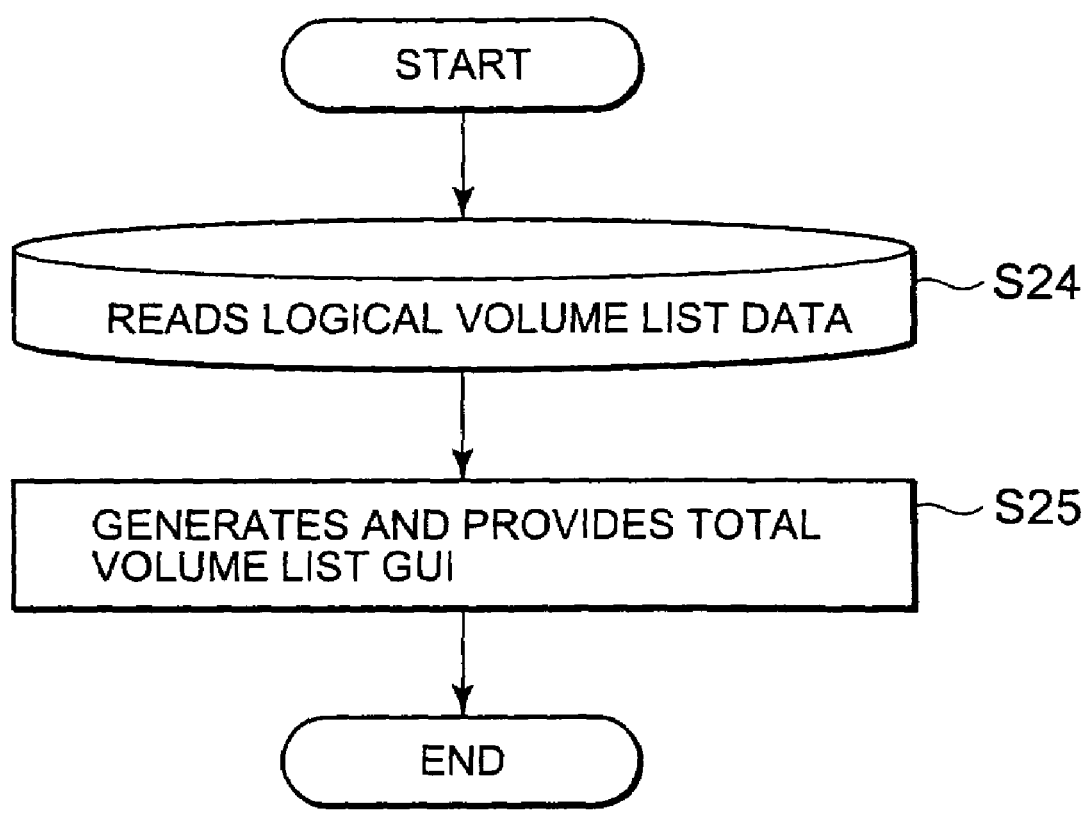
FIG. 10 is a flow chart depicting an example of the processing flow which is executed by the volume acquisition program 73 in the management host 51.

FIG. 10 shows an example of the processing flow to be executed by the volume acquisition program 73 in the management host 51.

The volume acquisition program 73 executes the processing shown in FIG. 10 when a predetermined event is generated, such as the case when the volume list inquiry is received from the administrator 48 via the management client 49. In other words, the volume acquisition program 73 accesses the management host database 77, reads the logical volume list data 63 from the database 77 (S24), generates the total volume list GUI 89 where the content of the data 63 is stored, and provides this GUI 89 to the management client 49 (S25).

Figure 11:
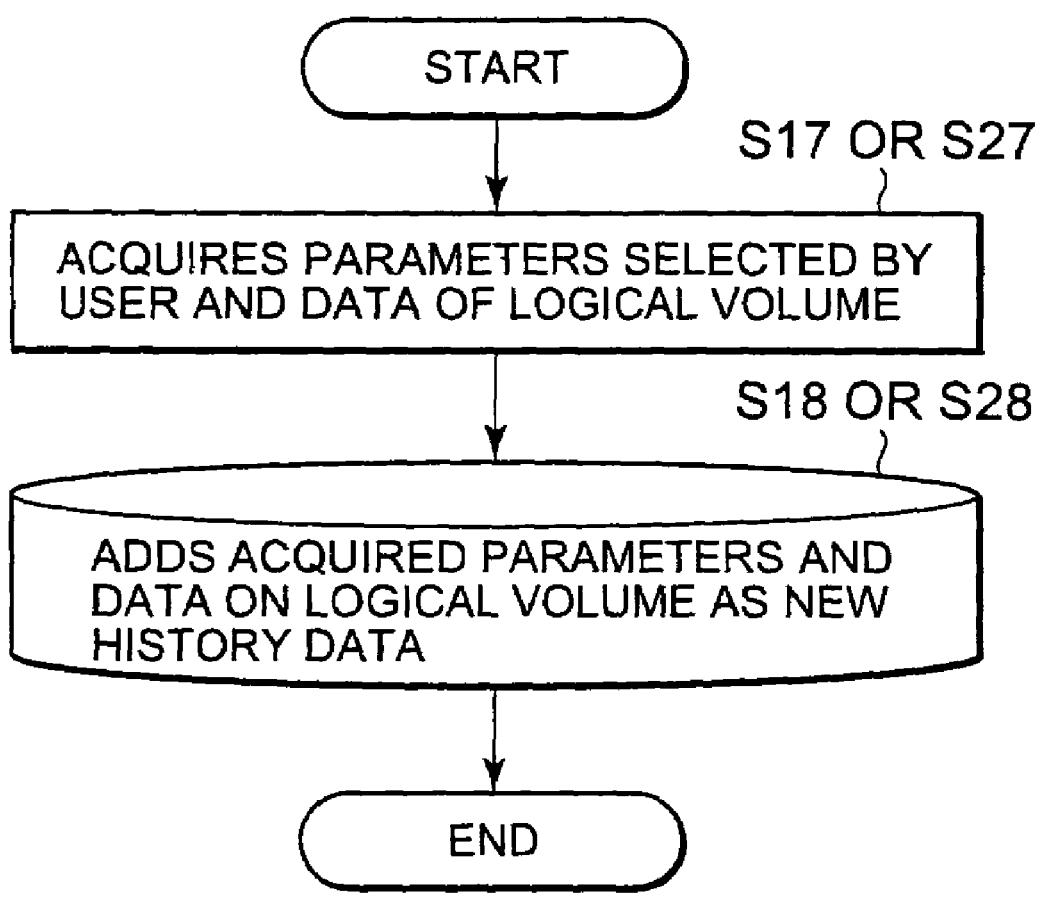
FIG. 11 is a flow chart depicting an example of the processing flow which is executed by the history data update program 75 in the management host 51.

FIG. 11 shows an example of the processing flow to be executed by the history data update program 75 in the management host 51.

The history data update program 75 acquires the logical volume data selected by the administrator 48 and the parameter data used as the above mentioned retrieval key. (S17 or S27), and updates the history data 65 in the management host database 77 based on this acquired data (S18 or S28). Specifically, the history data update processing program 75, for example, removes the logical volume identifier from the received logical volume data, removes the flag from the parameter data used as the above mentioned retrieval key, generates a new history data 65 comprised of a plurality of data elements in the logical volume data and parameter data which remains after removal, and the date and time when the logical volume data desired by the administrator 48 was selected (or date and time when the data of the logical volume identifier, etc. was sent to the storage sub-system 21), and registers this new history data 65 in the management host database 77.

One of the processings executed by the above mentioned computer system is a processing for determining the volume candidate list in S100 in FIG. 9, that is, a volume candidate refining processing for limiting K number of (K≧2) logical volume data to less than K number of logical volume data based on one or more history data 65. There are many methods for executing this refining processing. One of these methods will now be described.

Figure 12A:
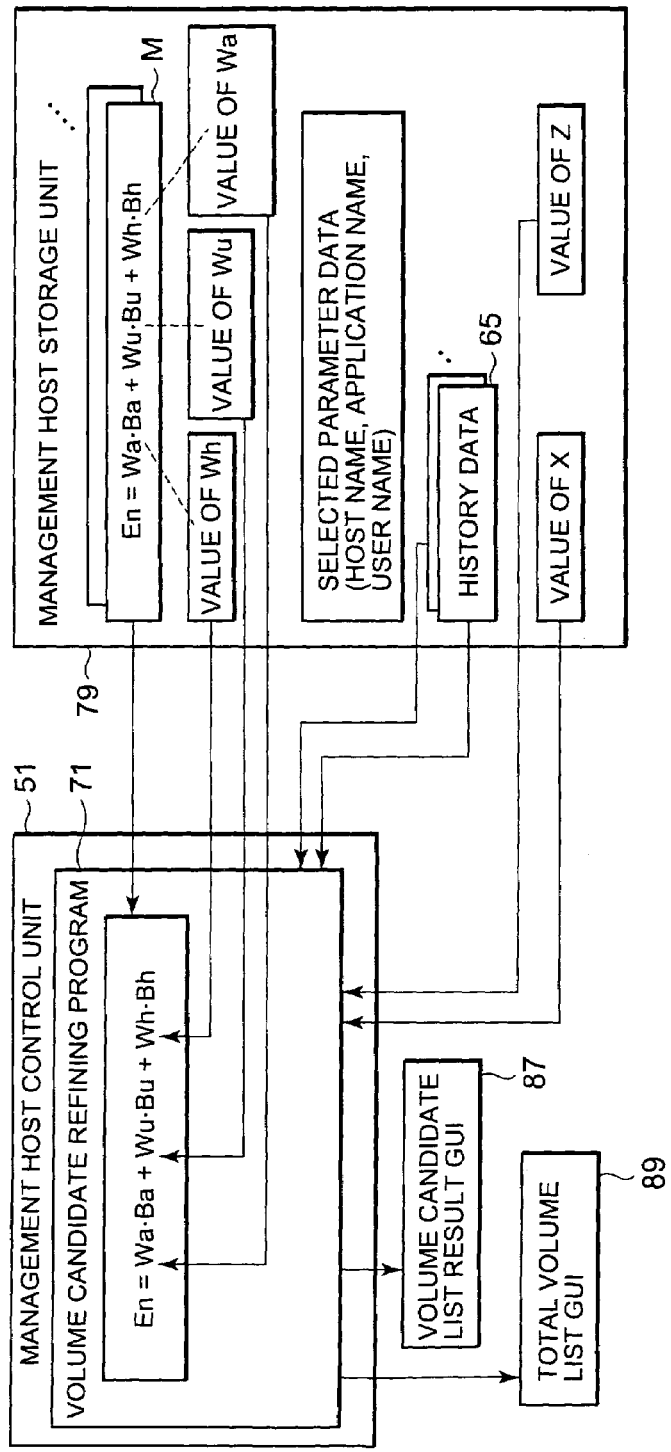
FIG. 12 is a diagram depicting an example of a method to execute volume candidate refining processing.

FIG. 12A shows an example of a method for executing the volume candidate refining processing.

In the example of a method, the volume candidate refining program 71 calculates the evaluation value to indicate how much the data matches the parameter data selected using the parameter list result GUI 85 (see FIG. 5) for each of one or more history data 65. And based on the calculated one or more evaluation values, the volume candidate refining program 71 determines which history data 65 of the one or more history data 65 is used with priority, and judges whether a logical volume data matching the determined history data 65 exists in the volume list data 63. If it is judged as "exists", the volume candidate refining program 71 generates the volume candidate list GUI 87 where the content of the above mentioned matched logical volume data is stored, and provides it to the management client 49, and if judged as "not exist", the volume candidate refining program 71 generates the total volume list GUI 89, and provides it to the management client 49. This processing will be described more specifically.

Figure 12B:
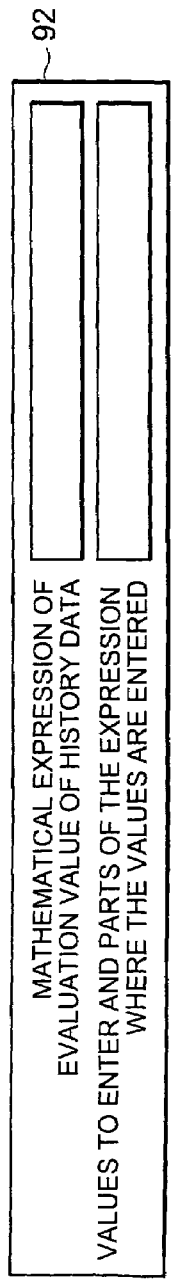

In the management host storage unit 79, at least one mathematical expression M for calculating the evaluation value is stored. At least one mathematical expression M may or may not be changeable by an individual, such as an administrator 48. If changeable, the management host 51 displays the GUI 92 as shown in the example in FIG. 12B for the administrator 48, and if a mathematical expression of the evaluation value of the history data is input via the GUI 92, the mathematical expression which was input can be registered in the management host storage unit 79 by adding it to the management host storage unit 79, or by overwriting the old mathematical expression. The management host 51 can also accept the input of the value to enter and the parts of the expression where values are entered in the desired mathematical expression via the GUI 92. When the mathematical expression is specified and the input of the value to enter and the parts of the expression where values are entered in the specified mathematical expression is received, the management host 51 registers the composing elements of the specified mathematical expression and the values to be set for the composing elements in the management host storage unit 79 corresponding to the specified mathematical expression. By this, the volume candidate refining program 71 selects a desired or predetermined mathematical expression from at least one mathematical expression M stored in the management host storage unit 79, and specifies the composing elements associated to the mathematical expression and the values to be set there, so as to calculate the evaluation value for each history data 65.

An example of at least one mathematical expression M can be stored in the management host storage unit 79 is $$En = Wa \cdot Ba + Wu \cdot Bu + Wh \cdot Bh \quad (1)$$

Here Wa indicates the weight of the application name, Wu indicates the weight of the user name, and Wh indicates the weight of the host name. Ba indicates whether an application name, which conforms to (e.g. matches) the application names in the parameter data selected by the administrator 48, is included in the evaluation value calculation target history data 65 (e.g. whether 1 or 0). Bu indicates whether a user name, which conforms to (e.g. matches) the user names in the parameter data selected by the administrator 48, is included in the evaluation value calculation target history data 65 (e.g. whether 1 or 0). Bh indicates whether a host name, which conforms to (e.g. matches) the host names in the parameter data selected by the administrator 48, is included in the evaluation value calculation target history data 65 (e.g. whether 1 or 0) In the management host storage unit 79, a value set for Wa, a value set for Wu and a value set for Wh are associated to expression (1). At least two values of Wu, Wa and Wh may be the same, but all of the values Wu, Wa and Wh may be different. For example, Wu, Wa and Wh may have a relationship of Wh>Wa>Wu. At least one of the values of Wa, Wu and Wh may be changeable or unchangeable by an individual, such as an administrator 48. If changeable, the management host 51 can accept the input of the values desired by the operator via the GUI 92 shown in the example in FIG. 12B.

In the management host storage unit 79, a value X which indicates how many history data 65 from the top priority among the one or more history data 65 are used may be registered. If the logical volume data is refined based on the history data 65 which was used, a value Z, which indicates how many logical volume data having a same attribute (e.g. logical volumes of which contents of logical volume capacity, RAID type and redundancy flag all match) are registered as candidates, may be used in the management host storage unit 79.

Now the volume candidate refining processing that the volume candidate refining program 71 executes using the above expression (1) will be described specifically. In the following description, at least one of FIG. 12, FIG. 13A and FIG. 13B, and FIG. 14 (FIG. 14A-FIG. 14F) for showing the update flow of the history data 65 may be referred to. Also in the following description, it is assumed that Wu, Wa and Wh have a relationship of Wh>Wa>Wu (e.g. Wh=4, Wa=2 and Wu=1), and that the value X (the number of history data 65 to be used) is 1.

The volume candidate refining program 71 can execute the following first judgment processing 1 and the second judgment processing when the parameter data comprising a host name, application name and/or user name is received. First judgment processing: The processing of retrieving X or less number of history data 65 having the received parameter data, and judging whether all of specific attribute elements of the retrieved history data 65, such as logical volume data of which the content conforms to (e.g. matches) all of the logical volume capacity, RAID type and redundancy flag, exist in the logical volume list data 63.

Second judgment processing: The processing of judging whether a logical volume data of which content conforms to (e.g. matches) at least one of specific attribute elements which are registered most frequently among the retrieved X number of history data 65, such as at least one (e.g. all) of the logical volume capacity which is registered most frequently, RAID type which is registered most frequently, and redundancy flag which is registered most frequently, exists in the logical volume list data 63.

The volume candidate refining program 71 acquires the parameter list data 61 and logical volume list data 63. FIG. 13A shows a specific configuration example of an acquired parameter list data 61, and FIG. 13B shows a specific configuration example of an acquired logical volume list data 63. For the redundancy flags shown in FIG. 13B, "true" indicates that a copy of the logical volume 31 exists, and "false" indicates that a copy of the logical volume 31 does not exist.

It is assumed that the volume candidate refining program 71 receive the parameter data with [host name="host1", user name="user1", application name="app1"] via the parameter list result GUI 85. In this case, the volume candidate refining program 71 attempts to calculate the evaluation value for each history data 65 using this parameter data and the above expression (1).

However, if the history data 65 does not exist in the management host storage unit 51, as shown in FIG. 14A, calculation of the evaluation value of the history data 65 is not performed, and therefore the first judgment processing and the second judgment processing are not executed. In this case, the volume candidate refining program 71 provides the total volume list GUI 89 to the management client 49.

If a selection of the logical volume data with ["Volume.001" (10 Mbytes, RAID0, true)] is received via the total volume list GUI 89, the history data update processing program 75 generates the new history data 65, as shown in FIG. 14B, using the logical volume data and the above mentioned parameter data [host name="host1", user name="user1", application name="app1"], and registers it in the management host database 77.

Then it is assumed that the volume candidate program 71 received the parameter data with [host name="host1", user name="user1", application name="app2"] via the parameter list result GUI 85. In this case, the volume candidate refining program 71 determines the evaluation value for each history data 65 using the parameter data and the above mentioned expression (1).

If there is only one history data 65, as shown in FIG. 14B, the history data 65 with #1, shown in FIG. 14B, is used regardless what value the evaluation value is as a result of the evaluation value calculation. The volume candidate refining program 71 executes the first judgment processing (the second judgment processing if necessary) using this history data 65 with #1. As a result, two logical volume data (logical volume identifiers 001 and 006) having attribute elements matching the attribute elements [10 Mbyte, RAID0, true] of the history data 65 with #1 are acquired from the logical volume list data 63, shown in the example in FIG. 13B. The volume candidate refining program 71 generates the volume candidate list result GUI 87 where the content of the acquired two logical volume data is stored, and provides it to the management client 49. If a predetermined input, such as information on the logical volume desired by the administrator, cannot be found, is received via the GUI 87, the volume candidate refining program 71 provides the total volume list GUI 89 to the management client 49.

If the selection of the logical volume data with ["Volume.002" (15 Mbytes, RAID0, redundancy flag=true] is received via the total volume list GUI 89, for example, the history data update processing program 75 generates a new history data 65 with #2, as shown in FIG. 14, using the logical volume data and the above mentioned parameter data [host name="host1", user name="user1", application name="app2"], and registers it in the management host database 77.

Then it is assumed that the volume candidate refining program 71 received the parameter data with [host name="host2", user name="user 2", application name="app2"] via the parameter list result GUI 85. In this case, the volume candidate refining program 71 determines the evaluation value for each history data 65 using the parameter data and the above mentioned expression (1).

If the history data 65 with #1 and #2 exist, as shown in FIG. 14C, the evaluation value of the history data 65 with #2 is higher than the evaluation value of the history data 65 with #1 as a result of the evaluation value calculation, according to the relationship Wh>Wa>Wu. Because in the history data 65 with #1, none of host name, application name and user name thereof match any data element of the above mentioned parameter data [host name="host2", user name="user2", application name="app2"] but in the history data 65 with #2, the application name out of the host name, application name and user name thereof matches the application name of the parameter data. Therefore, in this case, the history data 65 with #2 is used.

Now the above mentioned first judgment processing (second judgment processing if necessary) is executed using the history data with #2.

By repeating the above processing, the history date 65, as shown in the examples in FIG. 14E-FIG. 14F, increases.

According to the above mentioned first example, each time the logical volume 31, to be allocated to the host (or a combination of host and application and/or user), is selected, the history data 65 to indicate the relationship of a host and attributes of a logical volume 31 allocated to the host is automatically generated and stored. And if the attributes of the allocation destination candidate (e.g. above mentioned parameter data) is selected by the administrator, the logical volume data matching the attribute of the allocation destination candidate as closely as possible is selected from the plurality of logical volume data based on the stored history data 65, and is provided to the administrator. By this, the burden on the operator to allocate a logical volume can be decreased.

EXAMPLE 2

The second example of the embodiment of the present invention will now be described. In the following description, primarily the differences from the first example will be described, and the description on the redundancy aspects with the first example will be omitted or simplified.

Figure 15:
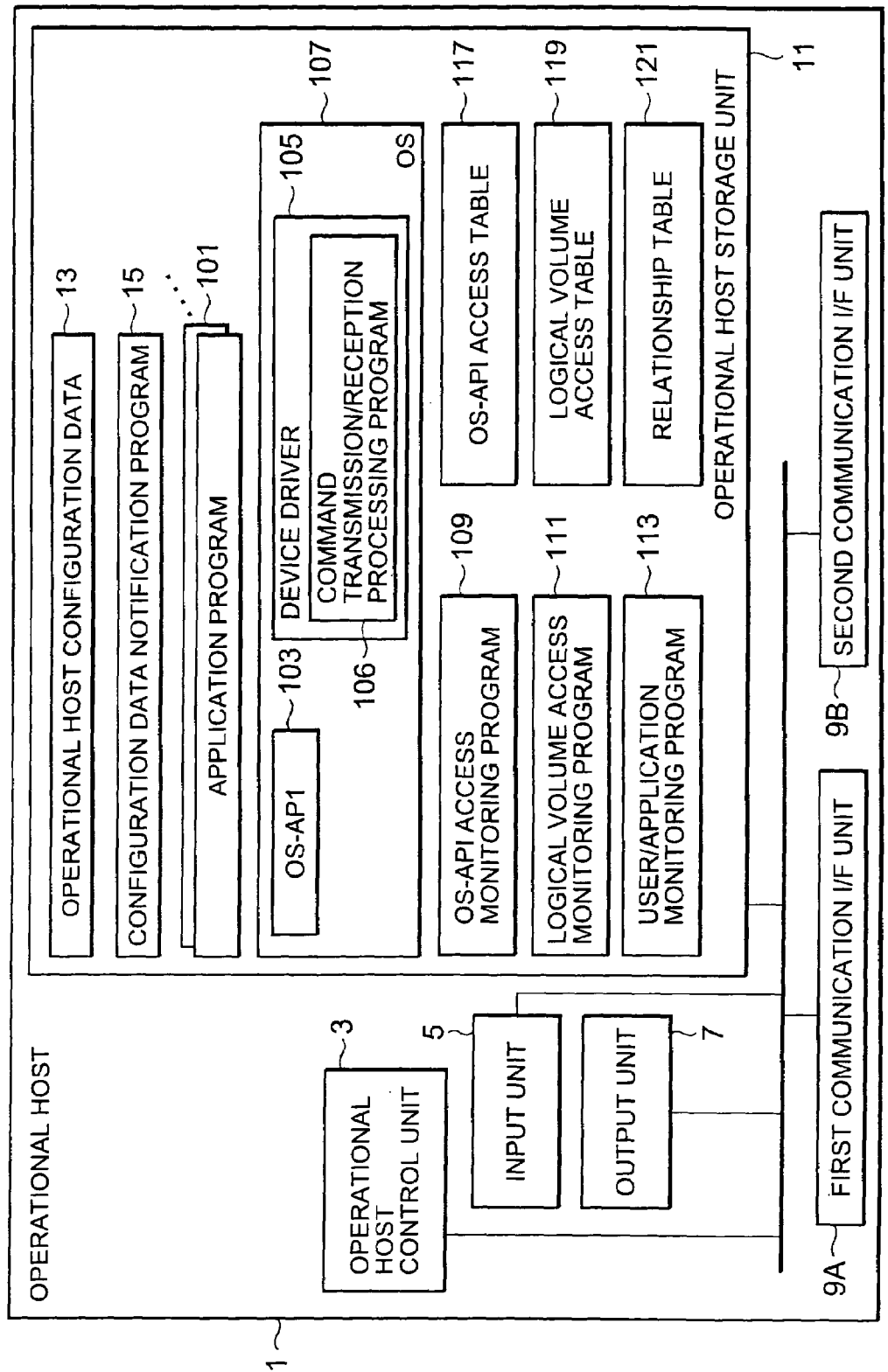
FIG. 15 is a diagram depicting a configuration example of the operational host 1 according to the second example of an embodiment of the present invention.

FIG. 15 shows a configuration example of the operational host 1 according to the second example.

In the operational host storage unit 11, one or more applications 101, OS 107, OS-API access monitoring program 109, logical volume access monitoring program 111, user/application monitoring program 113, OS-API access table 117, logical volume access table 119 and relationship table 121 are stored. The OS 107 is Windows (registered trademark) or UNIX (registered trademark), for example, and include OS-API 103 and device driver 105 (the device driver 105 may exist outside or under OS 107).

OS-API 103 is an application interface program installed in OS 107, and is an API for data access, for example. The OS-API 103 is called up by the application 101 in-execution (application 101 read by the operational host control unit 3), and transmits/receives data or commands to/from the application 101.

The device driver 105 is a driver (computer program) of the storage sub-system 21, and has a command transmission/reception processing program 106. The command transmission/reception processing program 106 generates I/O commands (e.g. commands conforming to SCSI protocol) for the storage sub-system 21, and executes the processing to transmit an I/O command to the storage sub-system 21. Specifically, for example, the command transmission/reception processing program 106 receives a data write request or data read request from the application 101 via the OS-API 103, then based on the write request or read request, the command transmission/reception processing program generates an I/O command addressed to a logical volume according to the write request or read request, and transmits the generated I/O command to the storage sub-system 21 having the logical volume with that address.

FIG. 16A shows a configuration example of the OS-API access table 117.

In the OS-API access table 117, information on the application (and/or user) which called up the OS-API 103 and information on the data which the OS-API 103 received are registered. Specifically, for example, each time the OS-API 103 is called up and receives data, the names of the application and user which called up the OS-API 103, the content of the data which the OS-API 103 received (e.g. data to be sent to the logical volume 31 or data read from the logical volume 31), and the date and time on the call up of the OS-API 103 are registered in the OS-API access table 117. For the date and time on the call up of the OS-API 103, the date and time at various timings can be used, such as the date and time when the OS-API 103 was called up, or the date and time when the user/application monitoring program 113 received notification on the application name, etc. from the OS-API access monitoring program 109.

FIG. 16B shows a configuration example of the logical volume access table 119.

In the logical volume access table 119, information on the logical volume 31 to be the destination of the I/O command and information on the data to be transmitted to the logical volume 31 or to be received from the logical volume 31 based on the I/O command are registered. Specifically, for example, each time the command transmission/reception processing program 106 of the device driver 105 generates and issues an I/O command, the date and time on issuing of the I/O command, the identifier of the logical volume 31 to be the destination of the I/O command, and the content of the data to be transmitted to the logical volume 31 or to be received from the logical volume 31 based on the I/O command are registered in the logical volume access table 119. For the date and time on issuing the I/O command, the date and time at various timings can be used, such as the date and time when the I/O command was generated, or the date and time when the I/O command was received.

FIG. 16C shows a configuration example of the relationship table 121.

In the relationship table 121, the relationship of a logical volume 31 and an application (and/or a user) which accessed the logical volume 31 is registered. Specifically, for example, an identifier of the accessed logical volume, date and time when the logical volume 31 was accessed (e.g. date and time when I/O command was issued), name of the user who accessed the logical volume 31, and name of the application which accessed the logical volume 31 are associated in the relationship table 121.

Figure 17:
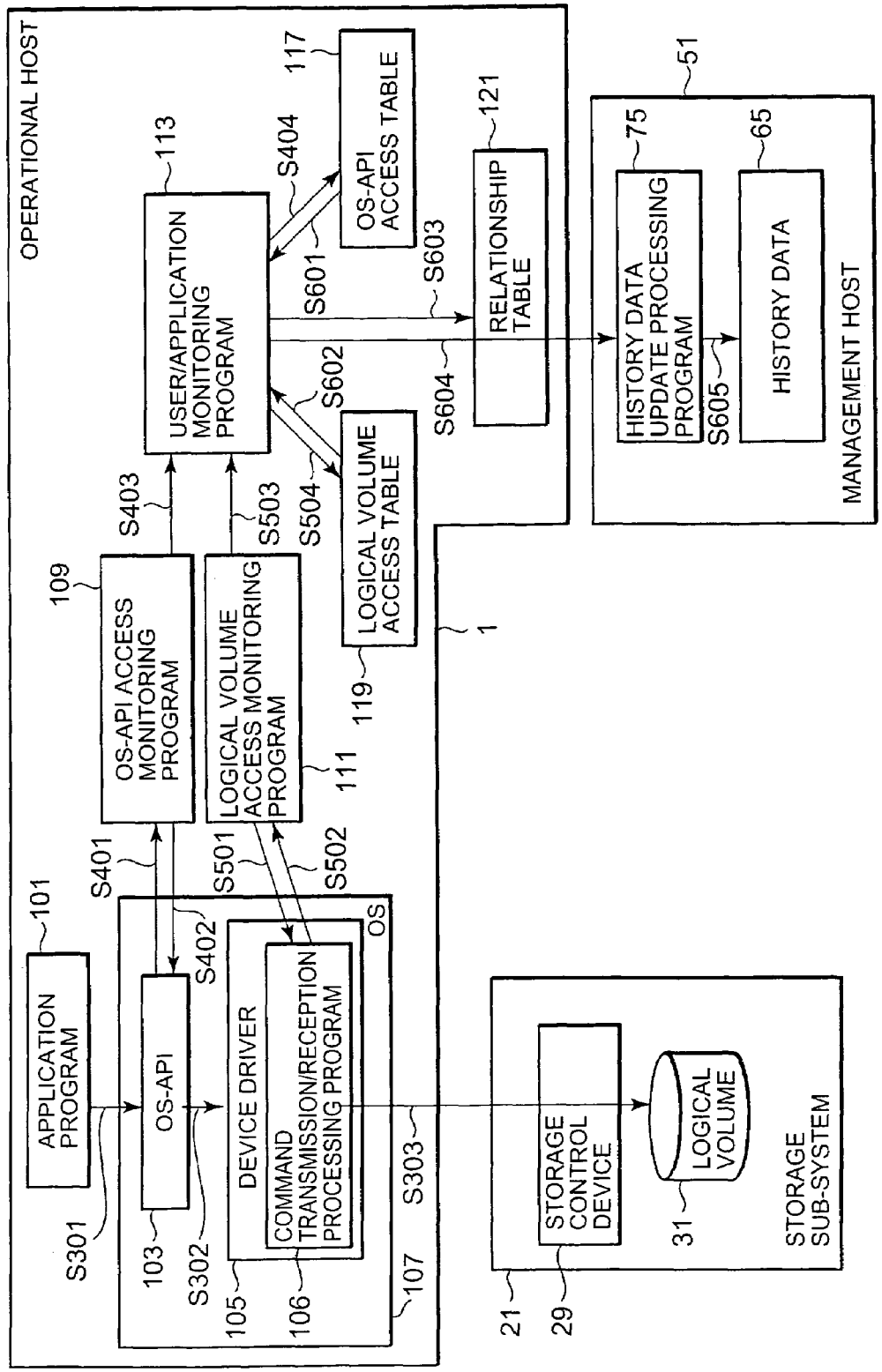
FIG. 17 is a diagram depicting an overview of the processing to be executed by the computer system according to the second example of an embodiment of the present invention.

FIG. 17 shows an overview of the processing to be executed in the computer system according to this second example. The processing will now be described with reference to FIG. 17, and also the OS-API access monitoring program 109, logical volume access monitoring program 111 and user/application monitoring program 113 will be described. In this description, FIG. 18A and FIG. 18B will be referred to when necessary.

When the application 101 in-execution accesses a logical volume 31 in the operational host 1, for example, the application 101 calls up the OS-API 103 and issues a write request or read request of the data to the OS-API 103 (S301). The OS-API 103, which was called up, accesses the device driver 105 of the storage sub-system 21, and issues the write request or read request to the device driver 105 (S302). The command transmission/reception processing program 106 of the device driver 105 generates an I/O command addressed to the logical volume 31 according to the received write request or read request, and issues this I/O command to the logical volume 31 (S303). By this flow, the OS-API 103 can receive the data written in the logical volume 31 from the application 103 or receives the data read from the logical volume 31 via the command transmission/reception processing program 106. The command transmission/reception processing program 106 can also receive the data written in the logical volume 31 from the OS-API 103 or data read from the logical volume 31.

The OS-API access monitoring program 109 is a computer program for specifying the application or the user which requested access to the logical volume 31. The OS-API access monitoring program 109 is a resident computer program of the OS-API 103. The OS-API access monitoring program 109 monitors the OS-API 103 (S401), and if it is detected that the OS-API 103 was called up, the OS-API access monitoring program 109 specifies the date and time on the call up of the OS-API 103 and the names of the application and the user which called up the OS-API 103 (user name need not be specified) (S402). The names of the application and the user which called up the OS-API 103 can be specified based on the information held by the OS (e.g. user ID used to logon to the OS). The OS-API access monitoring program 109 notifies the specified application name, user name, date and time, content of accessed data (e.g. content of data to be sent to the logical volume 31 or data read from the logical volume 31) to the user/application monitoring program 113 (S403).

The logical volume access monitoring program 111 is a computer program for specifying the logical volume 31 to be the access destination. The logical volume access monitoring program 111 is, for example, a resident computer program of the command transmission/reception processing program 106 of the device driver 105. The logical volume access monitoring program 111 monitors the command transmission/reception processing program 106 (S501), and if it is detected that the I/O command is generated or issued by the command transmission/reception processing program 106, the logical volume access monitoring program 111 refers to that I/O command and specifies the identifier (e.g. logical unit number) of the logical volume 31 at the destination of the I/O command (S502). The logical volume access monitoring program 111 also specifies the date and time when the I/O command is issued. The logical volume access monitoring program 111 notifies the specified logical volume identifier and the date and time, and the content of the data received (transmitted) by the command transmission/reception processing program 106 to the user/application monitoring program 113 (S503).

The user/application monitoring program 113 is a computer program for understanding the relationship between the application/user and the logical volume 31 based on the notification from the OS-API access monitoring program 109 and the logical volume access monitoring program 109, and notifying the understood relationship to the management host 51.

Specifically, for example, the user/application monitoring program 113 registered the content of the notification (date and time, application name, user name and data content) received from the OS-API access monitoring program 109 to the OS-API access table 117 (S404). FIG. 18A shows a concrete example of the OS-API access table 117.

Also the user/application monitoring program 113, for example, registers the content of notification (date and time, logical volume identifier and data content) received from the logical volume access monitoring program 111 to the logical volume access table 119 (S504). FIG. 18A shows a concrete example of the logical volume access table 119.

Also the user/application monitoring program 113, for example, executes the following processing, S601-S604, if at least one of S404 and S504 is executed. For example, the user/application monitoring program 113 acquires the OS-API access table 117 (S601), acquires the logical volume access table 119 (S602), compares the acquired tables 117 and 119, and generates the relationship table 121 based on the comparison result (S603). Specifically, describing with reference to FIG. 18A, if it is detected that at least one data content registered in table 117 and at least one data content registered in table 119 conform to each other (e.g. match), the user/application monitoring program 113 acquires the user name and application name corresponding to the data content from the OS-API access table 117 (date and time may also be acquired), acquires the logical volume identifier and date and time corresponding to the data content from the logical volume access table 119 (date and time may not be acquired), and generates the relationship table 121 where the acquired information is registered. The user/application monitoring program 113 notifies the content of the generated relationship table 121 and host name to the management host 51 (S604). For the data content to be registered, one or both the header and main part of the data file, for example, can be used.

The history data update processing program 75 of the management host 51 updates the history data 65 based on the content of the received relationship table and the host name (S605). Specifically, for example, if the host name and the content of the relationship table 121 shown in the example in FIG. 18A are received, the history data update processing program 75 registers the received host name, date and time, user name and application name included in the content of the received relationship table 121, in the history data 65. The history data update processing program 75 acquires the attributes (e.g. volume capacity, RAID type and redundancy flag) corresponding to the logical volume identifier from the logical volume list data 63 using the logical volume identifier included in the content of the received relationship table 121 as a retrieval key, and registers the acquired attributes to the above mentioned history data 65 where the application name, etc. are recorded. By this, the history data, as shown in the example in FIG. 18B, is completed. The history data update processing program 75 registers the history data 65 completed like this in the management host database 77.

FIG. 19 shows an example of the processing flow which the user/application monitoring program 113 in the operational host 1 executes.

The user/application monitoring program 113 is in standby status until notification is received from at least one of the OS-API access monitoring program 109 and the logical volume access monitoring program 111 (S300).

If notification is received from at least one of the OS-API access monitoring program 109 and the logical volume access monitoring program 111 (YES in S300), the user/ application monitoring program 113 registers the content of the notification in the OS-API access table 117 if it is the notification from the OS-API access monitoring program 109 (S404). If the notification is from the logical volume access monitoring program 111, on the other hand, the user/application monitoring program 113 registers the content of the notification in the logical volume access table 119 (S504).

If at least one of the processings in S404 and S504 is executed, the user/application monitoring program 113 executes the processing of the above mentioned S603 and S604.

According to this second example, if the application 101 accesses the logical volume 31, the relationship table 121, to indicate the relationship of the access source (application, user and host) and the access destination (logical volume 31) is automatically created, and a new history data 15 is generated based on the relationship table 121, so each time the application 101 access the logical volume 31, the history data 65 is stored. By this, the history data 65 to be judgment material to determine a candidate of the logical volume 31 (that is to refine the logical volumes 31) is created and stored, even if the administrator 48 does not allocate the logical volumes in advance.

The preferred embodiments and some examples of the present invention were described above, but these are merely examples to describe the present invention, and the scope of the present invention is not limited by these embodiments and examples. The present invention can be implemented by various other embodiments. For example, at least one of the operational host 1, management client 49 and management host 51 may be one constructed by a plurality of computer machines. The operational host 1 may have all or a part of the computer programs of the management host 51. In other words, the operational host 1 may execute such processing as generating and storing the history data 65, refining the logical volumes based on the stored history data 65, and allocating the logical volumes to the operational host 1 itself.

What is claimed is:

1. A management computer coupleable to a storage system having a plurality of logical volumes and a host computer having an application program, comprising:
    a first storage area that stores a plurality of logical volume data where attributes of the plurality of logical volumes are recorded respectively;
    a second storage area that stores allocation destination candidate data where the attributes of an allocation destination candidate selected from a plurality of allocation destination candidates are recorded, wherein the storage system has storage configuration data indicating which logical volume is allocated to which allocation destination;
    a third storage area that stores a plurality of history data to indicate a relationship of a logical volume having a certain attribute among said plurality of logical volumes to an allocation destination candidate having a certain attribute among said one or more allocation destination candidates;
    a volume refining unit that refines said plurality of logical volume data to one or more logical volume data based on said plurality of logical volume data, said allocation destination candidate data and said plurality of history data, and outputting the content of said refined one or more logical volume data;
    a receiving unit configured to receive a host configuration data from the host computer; and
    a creating unit configured to create parameter list data based on the host configuration data;

wherein
    said allocation destination candidate is the host computer and/or the application program:
    said volume refining unit executing the steps of:
    receiving a retrieval key from an administrator, and
    providing a GUI which accepts selection of a desired logical volume data from said refined one or more logical volume data;
    said management computer further comprising a history update unit that generates history data and stores said history data in said third storage area, said history data having:
    (A) at least one attribute element among the attributes included in said logical volume data selected using said GUI;
    (B) at least one attribute element among the attributes included in said allocation destination candidate data; and,
    (C) said retrieval key which is used for getting said refined one or more logical volume data including said logical volume data selected using said GUI,
    said parameter list data consists of a plurality of parameter data;
    said retrieval key is parameter data selected by the administrator from the parameter list data:
    said host configuration data consists of a plurality of sets, each set comprising a host ID and an application ID and/or a user ID;
    said parameter data is a set comprising a host ID and an application ID and/or a user ID,
    said volume refining unit performs the following:
    (a) for each of the plurality of history data, calculating an evaluation value to indicate how much the data matches the parameter data selected using the parameter list data;
    (b) determining which history data of the plurality of history data is used during said refining of said plurality of logical volume data to said one or more logical volume data, based on the calculated evaluation values;
    (c) judging whether a logical volume data matching the determined history data exists in the first storage area;
    (d) outputting the content of the matched logical volume data if it is judged that such a logical volume data exists;
    said evaluation value is calculated based on the following mathematical expression:

$$EN = Wa \cdot Ba + Wu \cdot Bu + Wh \cdot Bh,$$ wherein said EN is said evaluation value,
    said Wa indicates the weight of the application ID,
    said Wu indicates the weight of the user ID,
    said Wh indicates the weight of the host ID,
    said Ba indicates whether an application ID, which conforms to the application ID in the parameter data selected by the administrator, is included in a specific history data,
    said Bu indicates whether a user ID, which conforms to the user ID in the parameter data selected by the administrator, is included in the specific history data, and
    said Bh indicates whether a host ID, which conforms to the host ID in the parameter data selected by the administrator, is included in the specific history data.

2. The management computer according to claim 1, wherein
    the attributes included in said allocation destination candidate data have a plurality of allocation destination candidate attribute elements,
    each history data includes said plurality of allocation destination candidate attribute elements, and said volume refining unit selects the history data to be used for processing for refining the logical volume data, based on judgment whether an allocation destination candidate attribute element matching at least one of said plurality of allocation destination candidate attribute elements included in said allocation destination candidate data exists in the history data.

3. The management computer according to claim 2, comprising a fourth storage area that stores a weight value to indicate a weight for each allocation destination candidate attribute element.

wherein said volume refining unit determines an evaluation value for each history data, based on the information on whether an allocation destination candidate attribute element matching at least one of said plurality of allocation destination candidate attribute elements included in said allocation destination candidate data exists in each of the plurality of history data and each weight value of said plurality of allocation destination candidate attribute elements, and determines the history data which has the evaluation value matching a predetermined condition among the determined plurality of evaluation values as history data to be used for the processing for refining the logical volume data.

4. The management computer according to claim 3, wherein said allocation destination candidate is an information processing terminal that writes data to the logical volume or reads data from the logical volume;

said information processing terminal has one or more application programs registered, and said plurality of allocation destination candidate attribute elements include (1) terminal identification information of said information processing terminal, and (2) application identification information of one application program among said one or more application programs; and the weight value of the terminal identification information is higher than the weight value of the application identification information.

5. The management computer according to claim 1, wherein said history update unit acquires access relationship data, where the information indicating which allocation destination candidate among said plurality of allocation destination candidates accessed which logical volume among said plurality of logical volumes is described, generates history data based on said acquired access relationship data, and registers said generated history data in said third storage area.

6. The management computer according to claim 5, wherein said allocation destination candidate is an information processing terminal that writes data to the logical volume or reads data from the logical volume;

said information processing terminal has one or more application programs;

said information processing terminal further comprises:

an application interface unit to be an interface for the application program;

a command issuing unit that issues a command to said logical volume;

a monitoring unit that monitors said application interface unit and said command issuing unit;

an application access storage area that stores information on the access of the application interface unit; and a command access storage area that stores information on the access of the command issuing unit, said application interface unit receives a write request or read request of data from one of said one or more application programs, outputs said received write request or read request, and receives write data, which is a write target, from the application program which is said write request issuing source, and outputs the write data to said command issuing unit, or receives read data, which is a read target, and which was output from said command issuing unit, and outputs the read data to the application program which is said read request issuing source, said command issuing unit receives said write request or read request which was output, selects the logical volume to be a destination from said plurality of logical volumes according to the write request or read request, generates and outputs a write command or read command for the selected logical volume, and outputs said write data to said logical volume, or receives the read data from said logical volume responding to said read command, and outputs the read data to said application interface unit, said monitoring unit acquires the application identification information of the application program which issued a write request or read request to said application interface unit, acquires a first data content, which is a content of the write data or the read data received by said application interface unit, and writes said application identification information and said first data content to said application access storage area, acquires the logical volume identification information of a logical volume to be a destination of the write command or read command which was output by said command issuing unit from the write command or read command, acquires a second data content, which is a content of write data or read data received by said command issuing unit, writes said logical volume identification information and said second data content to said command access storage area, detects that said written first data content and second data content match, acquires the application identification information corresponding to said matched first data content from said application access storage area, and acquires the logical volume identification information corresponding to said matched second data content from said command access storage area, generates and outputs said access relationship data including said acquired application identification information and logical volume identification information, and said history update unit acquires said access relationship data which was output.

7. A volume management method, for use in a management computer coupled to a storage system having a plurality of logical volumes and a host computer having an application program, the volume management method comprising:

(1) storing a plurality of logical volume data to a first storage area where the attributes of a plurality of logical volumes are recorded respectively wherein the plurality of logical volumes are in the storage system;

(2) storing allocation destination candidate data to a second storage area where the attributes of an allocation destination candidate selected from a plurality of allocation destination candidates are recorded, wherein the storage system has storage configuration data indicating which logical volume is allocated to which allocation destination;

(3) storing a plurality of history data to indicate the relationship of a logical volume having a certain attribute among said plurality of logical volumes to an allocation destination candidate having a certain attribute among said plurality of allocation destination candidates to a third storage area;

(4) refining said plurality of logical volume data to one or more logical volume data based on said plurality of logical volume data, said allocation destination candidate data, and said plurality of history data;

(5) for each of the plurality of history data, calculating an evaluation value to indicate how much the data matches parameter data selected using parameter list data;

(6) determining which history data of the plurality history data is used during said refining of said plurality of logical volume data to one or more logical volume data, based on the calculated evaluation values;

(7) judging whether a logical volume data matching the determined history data exists in the first storage area; and (8) outputting the content of the matched logical volume data if it is judged that such a logical volume data exists; wherein said allocation destination candidate is the host computer and/or the application program:

said refining operation executing as follows:

receiving a retrieval key from an administrator, and providing a GUI which accepts selection of a desired logical volume data from said refined one or more logical volume data;

said volume management method further comprising generating history data and storing said history data in said third storage area, said history data having:

(A) at least one attribute element among the attributes included in said logical volume data selected using said GUI;

(B) at least one attribute element among the attributes included in said allocation destination candidate data; and, (C) said retrieval key which is used for getting said refined one or more logical volume data including said logical volume data selected using said GUI.

said parameter list data consists of a plurality of parameter data;

said retrieval key is parameter data selected by the administrator from the parameter list data;

said host configuration data consists of a plurality of sets, each set comprising a host ID and an application ID and/or a user ID;

said parameter data is a set comprising a host ID and an application ID and/or a user ID, said evaluation value is calculated based on the following mathematical expression:

$$EN = Wa \cdot BA + Wu \cdot Bu + Wh \cdot Bh,$$ wherein said EN is said evaluation value, said Wa indicates the weight of the application ID, said Wu indicates the weight of the user ID, said Wh indicates the weight of the host ID, said Ba indicates whether an application ID, which conforms to the application ID in the parameter data selected by the administrator, is included in a specific history data, said Bu indicates whether a user ID, which conforms to the user ID in the parameter data selected by the administrator, is included in the specific history data, and said Bh indicates whether a host ID, which conforms to the host ID in the parameter data selected by the administrator, is included in the specific history data.

8. The management computer according to claim 4, wherein said information processing terminal further has one or more pieces of user identification information corresponding to one or more users respectively that are registered, and said plurality of allocation destination candidate attribute elements further includes:

one piece of user identification information among said one or more pieces of user identification information; and the weight value of the application identification information is higher than the weight value of the user identification information.

9. The management computer according to claim 3, wherein said allocation destination candidate is an information processing terminal that writes data to the logical volume or reads data from the logical volume;

said information processing terminal has one or more pieces of user identification information corresponding to one or more users respectively that are registered, and said plurality of allocation destination candidate attribute elements includes:

terminal identification information of said information processing terminal, and one piece of user identification information among said one or more pieces of user identification information; and the weight value of the terminal identification information is higher than the weight value of the user identification information.

10. The management computer according to claim 1, wherein said Wu, Wa and Wh have a relationship of Wh>Wa>Wu.

* * * * *